US012371552B2

(12) United States Patent
Boley et al.

(10) Patent No.: US 12,371,552 B2
(45) Date of Patent: Jul. 29, 2025

(54) TIRE TREAD RUBBER COMPOSITION AND RELATED METHODS

(71) Applicant: Bridgestone Americas Tire Operations, LLC, Nashville, TN (US)

(72) Inventors: Dennis C. Boley, Mogadore, OH (US); Kenny L. Howman, Ashland, OH (US); Benjamin C. Galizio, Munroe Falls, OH (US); Jamie L. Whyte, Kent, OH (US); Jessica L. Placke, Rocky River, OH (US); Anthony M. Unger, New Albany, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 459 days.

(21) Appl. No.: 17/614,946

(22) PCT Filed: May 28, 2020

(86) PCT No.: PCT/US2020/034934
§ 371 (c)(1),
(2) Date: Nov. 29, 2021

(87) PCT Pub. No.: WO2020/243311
PCT Pub. Date: Dec. 3, 2020

(65) Prior Publication Data
US 2022/0235205 A1    Jul. 28, 2022

Related U.S. Application Data

(60) Provisional application No. 62/854,106, filed on May 29, 2019.

(51) Int. Cl.
*C08L 9/00*    (2006.01)

(52) U.S. Cl.
CPC .......... *C08L 9/00* (2013.01); *C08L 2205/035* (2013.01)

(58) Field of Classification Search
CPC ....................................................... C08L 9/00
USPC ........................................................ 524/856
See application file for complete search history.

(56) References Cited

U.S. PATENT DOCUMENTS

| | | |
|---|---|---|
| 4,020,115 A | 4/1977 | Hargis |
| 5,021,522 A | 6/1991 | Durairaj |
| 5,218,038 A | 6/1993 | Johnson |
| 5,266,620 A | 11/1993 | Shinoda |
| 5,684,091 A | 11/1997 | Maly |
| 5,717,016 A | 2/1998 | Fuchs |
| 5,723,530 A | 3/1998 | Zanzig |
| 5,901,766 A | 5/1999 | Sandstrom |
| 6,013,737 A | 1/2000 | Takagishi |
| 6,020,455 A | 2/2000 | Pretzer |
| 6,046,266 A | 4/2000 | Sandstrom |
| 6,077,899 A | 6/2000 | Yatsuyanagi |
| 6,099,522 A | 8/2000 | Knopp |
| 6,107,389 A | 8/2000 | Oishi |
| 6,191,205 B1 | 2/2001 | Micouin |
| 6,201,059 B1 | 3/2001 | Wideman |
| 6,214,919 B1 | 4/2001 | Schlademan |
| 6,221,990 B1 | 4/2001 | Blok |
| 6,228,944 B1 | 5/2001 | Blok |
| 6,242,550 B1 | 6/2001 | Kralevich, Jr. |
| 6,245,873 B1 | 6/2001 | Wideman |
| 6,265,478 B1 | 7/2001 | Kralevich, Jr. |
| 6,274,685 B2 | 8/2001 | Blok |
| 6,281,317 B1 | 8/2001 | Kralevich, Jr. |
| 6,291,588 B1 | 9/2001 | Nahmias |
| 6,300,448 B2 | 10/2001 | Wideman |
| 6,316,567 B1 | 11/2001 | Kralevich, Jr. |
| 6,348,539 B1 | 2/2002 | Wideman |
| 6,357,499 B1 | 3/2002 | Kralevich, Jr. |
| 6,359,045 B1 | 3/2002 | Jeske |
| 6,376,593 B1 | 4/2002 | Sasaka |
| 6,410,776 B1 | 6/2002 | Roll |
| 6,429,245 B1 | 8/2002 | Francik |
| 6,444,335 B1 | 9/2002 | Wang |
| 6,444,759 B2 | 9/2002 | Datta |
| 6,455,636 B2 | 9/2002 | Sanada |
| 6,465,560 B1 | 10/2002 | Zanzig |
| 6,467,520 B2 | 10/2002 | Duddey |
| 6,469,101 B2 | 10/2002 | Nahmias |
| 6,469,125 B1 | 10/2002 | Fontana |

(Continued)

FOREIGN PATENT DOCUMENTS

| | | |
|---|---|---|
| CN | 102634085 A | 8/2012 |
| CN | 102869715 B | 4/2015 |

(Continued)

OTHER PUBLICATIONS

Third Party Submission with English translation submitted in Japanese Application No. 2022-136348, Dec. 15, 2023, 24 pp.
Baekelmans, Didier, International Search Report with Written Opinion from PCT/US2020/034926, 10 pp. (Oct. 9, 2020).
Baekelmans, Didier, International Search Report with Written Opinion from PCT/US2020/034930, 10 pp. (Oct. 9, 2020).
Baekelmans, Didier, International Search Report with Written Opinion from PCT/US2020/034934, 9 pp. (Oct. 9, 2020).

(Continued)

*Primary Examiner* — Deve V Hall
(74) *Attorney, Agent, or Firm* — Meredith E. Hooker; Jenny L. Sheaffer

(57) ABSTRACT

Disclosed herein are tire tread rubber compositions comprising a specified elastomer component, reinforcing silica filler, a specified hydrocarbon resin, liquid plasticizer, and a cure package. The elastomer component includes styrene-butadiene rubber; polybutadiene; and natural rubber, polyisoprene, or a combination thereof. Also disclosed are methods for providing a tire tread having improved dry handling performance while maintaining wet traction performance and wear.

20 Claims, No Drawings

(56) References Cited

U.S. PATENT DOCUMENTS

| | | |
|---|---|---|
| 6,518,350 B1 | 2/2003 | Kobayashi |
| 6,521,733 B1 | 2/2003 | Karato |
| 6,536,495 B1 | 3/2003 | Close |
| 6,548,594 B2 | 4/2003 | Luginsland |
| 6,579,963 B1 | 6/2003 | Vergopoulou-Markessini |
| 6,581,660 B2 | 6/2003 | Meza |
| 6,583,533 B2 | 6/2003 | Pelrine |
| 6,605,670 B1 | 8/2003 | Durairaj |
| 6,620,875 B2 | 9/2003 | Hong |
| 6,624,267 B1 | 9/2003 | Favrot |
| 6,649,678 B1 | 11/2003 | Sandstrom |
| 6,667,362 B2 | 12/2003 | Robert |
| 6,670,416 B1 | 12/2003 | Blok |
| 6,712,108 B1 | 3/2004 | Koeune |
| 6,740,700 B2 | 5/2004 | Kobayashi |
| 6,747,085 B2 | 6/2004 | Sone |
| 6,747,099 B1 | 6/2004 | Novits |
| 6,753,374 B1 | 6/2004 | Hannon |
| 6,759,497 B2 | 7/2004 | Gruen |
| 6,763,866 B1 | 7/2004 | Nguyen |
| 6,811,917 B2 | 11/2004 | Fitts |
| 6,812,288 B2 | 11/2004 | Kobayashi |
| 6,832,637 B2 | 12/2004 | Majumdar |
| 6,838,538 B2 | 1/2005 | Toyoizumi |
| 6,899,951 B2 | 5/2005 | Panz |
| 6,972,307 B2 | 12/2005 | Zimmer |
| 6,983,775 B2 | 1/2006 | Fuhrig |
| 6,984,706 B2 | 1/2006 | Karato |
| 6,988,523 B2 | 1/2006 | Blok |
| 7,015,271 B2 | 3/2006 | Bice |
| 7,028,734 B2 | 4/2006 | Özel |
| 7,045,567 B2 | 5/2006 | Yagi |
| 7,073,549 B2 | 7/2006 | Mizuno |
| 7,084,228 B2 | 8/2006 | Labauze |
| 7,096,903 B2 | 8/2006 | Weydert |
| 7,122,586 B2 | 10/2006 | Sandstrom |
| 7,122,592 B2 | 10/2006 | Wentworth |
| 7,138,450 B2 | 11/2006 | Wentworth |
| 7,196,129 B2 | 3/2007 | Migliarini |
| 7,199,175 B2 | 4/2007 | Vasseur |
| 7,241,843 B2 | 7/2007 | Miyazaki |
| 7,253,225 B2 | 8/2007 | Labauze |
| 7,253,235 B2 | 8/2007 | Nishioka |
| 7,259,205 B1 | 8/2007 | Pagliarini |
| 7,262,254 B2 | 8/2007 | Zanzig |
| 7,300,970 B2 | 11/2007 | Durel |
| 7,304,109 B2 | 12/2007 | Nishioka |
| 7,323,582 B2 | 1/2008 | Deschler |
| 7,335,692 B2 | 2/2008 | Vasseur |
| 7,342,070 B2 | 3/2008 | Tsukimawashi |
| 7,351,761 B2 | 4/2008 | Hochi |
| 7,365,111 B2 | 4/2008 | Buras |
| 7,367,369 B2 | 5/2008 | Sandstrom |
| 7,371,791 B2 | 5/2008 | Hattori |
| 7,425,602 B2 | 9/2008 | Howard |
| 7,427,651 B2 | 9/2008 | Shibata |
| 7,431,061 B2 | 10/2008 | Mathieu |
| 7,441,572 B2 | 10/2008 | Weydert |
| 7,442,733 B2 | 10/2008 | Araujo Da Silva |
| 7,448,425 B2 | 11/2008 | Vasseur |
| 7,491,767 B2 | 2/2009 | Durel |
| 7,498,371 B2 | 3/2009 | Durairaj |
| 7,514,494 B2 | 4/2009 | Lechtenboehmer |
| 7,528,199 B2 | 5/2009 | Taniguchi |
| 7,531,589 B2 | 5/2009 | Mizuno |
| 7,544,729 B2 | 6/2009 | Steger |
| 7,579,075 B2 | 8/2009 | Furusawa |
| 7,582,688 B2 | 9/2009 | Mabry |
| 7,629,408 B2 | 12/2009 | Cambon |
| 7,632,886 B2 | 12/2009 | Weng |
| 7,635,729 B2 | 12/2009 | Nip |
| 7,645,820 B2 | 1/2010 | Buras |
| 7,649,043 B2 | 1/2010 | Bergman |
| 7,659,337 B2 | 2/2010 | Jones |
| 7,671,132 B1 | 3/2010 | Thielen |
| 7,723,412 B2 | 5/2010 | Wermter |
| 7,825,183 B2 | 11/2010 | Robert |
| 7,834,074 B2 | 11/2010 | Brunelet |
| 7,882,874 B2 | 2/2011 | Robert |
| 7,902,285 B2 | 3/2011 | Dumke |
| 7,915,349 B2 | 3/2011 | Yamada |
| 7,981,966 B2 | 7/2011 | Kobayashi |
| 7,985,793 B2 | 7/2011 | Tse |
| 8,022,121 B2 | 9/2011 | Hattori |
| 8,022,129 B2 | 9/2011 | Tadaki |
| 8,022,132 B2 | 9/2011 | Kojima |
| 8,022,159 B2 | 9/2011 | Rachita |
| 8,030,392 B2 | 10/2011 | Ishida |
| 8,080,602 B2 | 12/2011 | Pille-Wolf |
| 8,119,730 B2 | 2/2012 | Edelmann |
| 8,148,486 B2 | 4/2012 | Hogan |
| 8,153,719 B2 | 4/2012 | Tse |
| 8,227,538 B2 | 7/2012 | York |
| 8,236,882 B2 | 8/2012 | Klockmann |
| 8,258,207 B2 | 9/2012 | Gaudet |
| 8,293,833 B2 | 10/2012 | Hochi |
| 8,302,643 B2 | 11/2012 | Ryba |
| 8,304,480 B2 | 11/2012 | Uchida |
| 8,312,905 B2 | 11/2012 | Steiner |
| 8,318,861 B2 | 11/2012 | Houjo |
| 8,324,310 B2 | 12/2012 | Robert |
| 8,334,333 B2 | 12/2012 | Hotaka |
| 8,349,940 B2 | 1/2013 | Hahn |
| 8,362,118 B2 | 1/2013 | Mihara |
| 8,397,775 B2 | 3/2013 | Ishida |
| 8,399,562 B2 | 3/2013 | Hogan |
| 8,426,508 B2 | 4/2013 | Hattori |
| 8,445,572 B2 | 5/2013 | Matsuda |
| 8,450,424 B2 | 5/2013 | Koelle |
| 8,453,693 B2 | 6/2013 | Skurich |
| 8,470,930 B2 | 6/2013 | Howard |
| 8,476,352 B2 | 7/2013 | Rodgers |
| 8,501,859 B2 | 8/2013 | Sandstrom |
| 8,507,582 B2 | 8/2013 | Takizawa |
| 8,569,431 B2 | 10/2013 | Miyazaki |
| 8,592,515 B2 | 11/2013 | Francik |
| 8,598,258 B2 | 12/2013 | Sato |
| 8,614,276 B2 | 12/2013 | Voge |
| 8,637,594 B2 | 1/2014 | Pille-Wolf |
| 8,637,597 B2 | 1/2014 | Lopitaux |
| 8,637,606 B2 | 1/2014 | Pille-Wolf |
| 8,658,730 B2 | 2/2014 | Ichikawa |
| 8,669,321 B2 | 3/2014 | Hattori |
| 8,674,002 B2 | 3/2014 | Nishikawa |
| 8,701,727 B2 | 4/2014 | Muller |
| 8,710,140 B2 | 4/2014 | Pialot |
| 8,720,507 B2 | 5/2014 | Kameda |
| 8,729,169 B2 | 5/2014 | Lee |
| 8,754,158 B2 | 6/2014 | Hattori |
| 8,759,438 B2 | 6/2014 | Lopez |
| 8,772,374 B2 | 7/2014 | Agostini |
| 8,813,798 B2 | 8/2014 | Tsumori |
| 8,815,995 B2 | 8/2014 | Vest |
| 8,857,482 B2 | 10/2014 | Taguchi |
| 8,871,832 B2 | 10/2014 | Takizawa |
| 8,871,840 B2 | 10/2014 | Wong |
| 8,875,764 B2 | 11/2014 | Miyazaki |
| 8,875,765 B2 | 11/2014 | Tsumori |
| 8,946,334 B2 | 2/2015 | Mizuno |
| 8,946,339 B2 | 2/2015 | Yoshida |
| 8,952,088 B2 | 2/2015 | Mehlem |
| 8,957,132 B2 | 2/2015 | Voge |
| 8,962,760 B2 | 2/2015 | Yuasa |
| 8,969,450 B2 | 3/2015 | Wang |
| 9,006,326 B2 | 4/2015 | Ono |
| 9,034,980 B2 | 5/2015 | Recker |
| 9,056,527 B2 | 6/2015 | Miyazaki |
| 9,061,548 B2 | 6/2015 | Miyazaki |
| 9,062,171 B2 | 6/2015 | Ihara |
| 9,062,182 B2 | 6/2015 | Cho |
| 9,062,189 B2 | 6/2015 | Rodgers |
| 9,074,078 B2 | 7/2015 | Miyazaki |
| 9,090,129 B2 | 7/2015 | Horiuchi |
| 9,096,735 B2 | 8/2015 | Morris |

(56) References Cited

U.S. PATENT DOCUMENTS

| | | | |
|---|---|---|---|
| 9,109,102 | B2 | 8/2015 | Wada |
| 9,120,890 | B2 | 9/2015 | Ishino |
| 9,126,457 | B2 | 9/2015 | Kaes |
| 9,132,698 | B2 | 9/2015 | Kojima |
| 9,133,371 | B2 | 9/2015 | Sandstrom |
| 9,139,721 | B2 | 9/2015 | Sugiura |
| 9,145,494 | B2 | 9/2015 | Veyland |
| 9,150,712 | B2 | 10/2015 | Takizawa |
| 9,150,714 | B2 | 10/2015 | Kramer |
| 9,169,375 | B2 | 10/2015 | Ishino |
| 9,175,124 | B2 | 11/2015 | Chaboche |
| 9,175,154 | B2 | 11/2015 | Lopez |
| 9,181,355 | B2 | 11/2015 | Ichikawa |
| 9,212,275 | B2 | 12/2015 | Sandstrom |
| 9,217,077 | B2 | 12/2015 | Torbruegge |
| 9,221,964 | B2 | 12/2015 | Ono |
| 9,233,578 | B2 | 1/2016 | Recker |
| 9,243,133 | B2 | 1/2016 | Voge |
| 9,249,284 | B2 | 2/2016 | Miyazaki |
| 9,260,588 | B2 | 2/2016 | Darnaud |
| 9,260,600 | B2 | 2/2016 | Takeda |
| 9,267,014 | B2 | 2/2016 | Darnaud |
| 9,273,197 | B2 | 3/2016 | Miyazaki |
| 9,284,433 | B2 | 3/2016 | Tokimune |
| 9,284,438 | B2 | 3/2016 | Sato |
| 9,290,585 | B2 | 3/2016 | Lee |
| 9,290,644 | B2 | 3/2016 | Sato |
| 9,296,850 | B2 | 3/2016 | Feher |
| 9,296,873 | B2 | 3/2016 | Koyama |
| 9,303,148 | B2 | 4/2016 | Cambon |
| 9,309,387 | B2 | 4/2016 | Kushida |
| 9,309,388 | B2 | 4/2016 | Okada |
| 9,321,909 | B2 | 4/2016 | Park |
| 9,328,185 | B2 | 5/2016 | Lee |
| 9,328,212 | B2 | 5/2016 | Miyazaki |
| 9,328,226 | B2 | 5/2016 | Stollberg |
| 9,328,227 | B2 | 5/2016 | Jagst |
| 9,333,802 | B2 | 5/2016 | Thomasson |
| 9,334,393 | B2 | 5/2016 | Miyazaki |
| 9,359,491 | B2 | 6/2016 | Sato |
| 9,365,703 | B2 | 6/2016 | Miyazaki |
| 9,365,704 | B2 | 6/2016 | Shibata |
| 9,387,724 | B2 | 7/2016 | Hirayama |
| 9,393,837 | B2 | 7/2016 | Voge |
| 9,394,426 | B2 | 7/2016 | Bastioli |
| 9,410,033 | B2 | 8/2016 | Kagawa |
| 9,416,252 | B2 | 8/2016 | Naka |
| 9,416,259 | B2 | 8/2016 | Mathey |
| 9,422,417 | B1 | 8/2016 | Lee |
| 9,428,641 | B2 | 8/2016 | Sato |
| 9,440,496 | B2 | 9/2016 | Hidrot |
| 9,441,098 | B1 | 9/2016 | Isitman |
| 9,446,631 | B2 | 9/2016 | Kameda |
| 9,447,263 | B2 | 9/2016 | Feldhues |
| 9,481,783 | B2 | 11/2016 | Isobe |
| 9,493,629 | B2 | 11/2016 | Yamada |
| 9,512,305 | B2 | 12/2016 | Ishino |
| 9,550,850 | B2 | 1/2017 | Sato |
| 9,567,451 | B2 | 2/2017 | Satou |
| 9,567,456 | B2 | 2/2017 | Sato |
| 9,580,569 | B2 | 2/2017 | Kamahori |
| 9,593,181 | B2 | 3/2017 | Sato |
| 9,593,226 | B2 | 3/2017 | Cambon |
| 9,598,508 | B2 | 3/2017 | Chun |
| 9,611,380 | B2 | 4/2017 | Thomasson |
| 9,617,401 | B2 | 4/2017 | Wong |
| 9,623,705 | B2 | 4/2017 | Tanaka |
| 9,624,367 | B2 | 4/2017 | Nakajima |
| 9,631,074 | B2 | 4/2017 | Peters |
| 9,631,075 | B2 | 4/2017 | Sato |
| 9,631,076 | B1 | 4/2017 | Ito |
| 9,644,046 | B2 | 5/2017 | Sekikawa |
| 9,650,503 | B2 | 5/2017 | Sandstrom |
| 9,657,161 | B2 | 5/2017 | Saintigny |
| 9,670,303 | B2 | 6/2017 | Yunfeng |
| 9,688,846 | B2 | 6/2017 | Kim |
| 9,713,941 | B2 | 7/2017 | Bondu, Jr. |
| 9,718,313 | B2 | 8/2017 | Bondu, Jr. |
| 9,718,911 | B2 | 8/2017 | Cho |
| 9,725,526 | B2 | 8/2017 | Chun |
| 9,745,454 | B2 | 8/2017 | Nakatani |
| 9,757,987 | B2 | 9/2017 | Jacoby |
| 9,758,652 | B2 | 9/2017 | Washizu |
| 9,764,594 | B2 | 9/2017 | Isitman |
| 9,771,469 | B2 | 9/2017 | Sandstrom |
| 9,790,306 | B2 | 10/2017 | Sato |
| 9,790,359 | B2 | 10/2017 | Imoto |
| 9,796,836 | B2 | 10/2017 | Kamada |
| 9,803,069 | B2 | 10/2017 | Kamada |
| 9,834,619 | B2 | 12/2017 | Chun |
| 9,840,569 | B2 | 12/2017 | Blok |
| 9,846,954 | B2 | 12/2017 | Stubblefiled |
| 9,862,814 | B2 | 1/2018 | Sakaki |
| 9,868,852 | B2 | 1/2018 | Nakajima |
| 9,873,780 | B1 | 1/2018 | Sandstrom |
| 9,878,580 | B2 | 1/2018 | Takeuchi |
| 9,909,004 | B2 | 3/2018 | Blok |
| 9,920,189 | B2 | 3/2018 | Sato |
| 9,944,741 | B2 | 4/2018 | Choi |
| 9,944,775 | B2 | 4/2018 | Voge |
| 9,969,865 | B2 | 5/2018 | Mihara |
| 9,976,014 | B2 | 5/2018 | Hennebert |
| 10,030,124 | B2 | 7/2018 | Colvin |
| 10,059,833 | B2 | 8/2018 | Sevignon |
| 10,071,598 | B2 | 9/2018 | Kojima |
| 10,093,750 | B2 | 10/2018 | Dire |
| 10,099,513 | B2 | 10/2018 | Navarro-Losada |
| 10,160,847 | B2 | 12/2018 | Lesage |
| 10,174,185 | B2 | 1/2019 | Otsuki |
| 10,189,978 | B2 | 1/2019 | Thuilliez |
| 10,189,987 | B2 | 1/2019 | Nishioka |
| 10,214,058 | B2 | 2/2019 | Hiraiwa |
| 10,214,638 | B2 | 2/2019 | Belin |
| 10,227,475 | B2 | 3/2019 | Darnaud |
| 10,227,481 | B2 | 3/2019 | Koda |
| 10,246,576 | B2 | 4/2019 | Peters |
| 10,253,158 | B2 | 4/2019 | Kim |
| 10,273,352 | B2 | 4/2019 | Amino |
| 10,279,626 | B2 | 5/2019 | Isitman |
| 10,301,459 | B2 | 5/2019 | Weber |
| 10,336,889 | B2 | 7/2019 | Isitman |
| 10,344,147 | B2 | 7/2019 | Hamann |
| 10,357,998 | B2 | 7/2019 | Thomasson |
| 10,364,335 | B2 | 7/2019 | Schnell |
| 10,377,883 | B2 | 8/2019 | Ambe |
| 10,385,192 | B2 | 8/2019 | Brace |
| 10,434,822 | B2 | 10/2019 | Maekawa |
| 10,435,541 | B2 | 10/2019 | Peters |
| 10,450,446 | B2 | 10/2019 | Salort |
| 10,472,503 | B2 | 11/2019 | Sekine |
| 10,487,197 | B2 | 11/2019 | Sekine |
| 10,487,198 | B2 | 11/2019 | Sekine |
| 10,493,800 | B2 | 12/2019 | Hamann |
| 10,493,801 | B2 | 12/2019 | Yokoyama |
| 10,494,511 | B2 | 12/2019 | Sekine |
| 10,494,512 | B2 | 12/2019 | Sekine |
| 10,519,254 | B2 | 12/2019 | Kyo |
| 10,519,299 | B2 | 12/2019 | Sevignon |
| 10,519,300 | B2 | 12/2019 | Brace |
| 10,526,472 | B2 | 1/2020 | Yamashiro |
| 10,533,083 | B2 | 1/2020 | Yamashiro |
| 10,538,129 | B2 | 1/2020 | Kunisawa |
| 10,538,600 | B2 | 1/2020 | Colvin |
| 10,563,050 | B2 | 2/2020 | Isitman |
| RE47,886 | E | 3/2020 | Mathey |
| 10,576,785 | B2 | 3/2020 | Yang |
| 10,584,236 | B2 | 3/2020 | Hahn |
| 10,611,886 | B2 | 4/2020 | Thompson |
| 10,669,407 | B2 | 6/2020 | Sekine |
| 10,669,408 | B2 | 6/2020 | Sekine |
| 10,676,599 | B2 | 6/2020 | Sekine |
| 10,689,508 | B2 | 6/2020 | Sekine |
| 10,710,409 | B2 | 7/2020 | Yokoyama |
| 10,752,769 | B2 | 8/2020 | Pan |

(56) References Cited

U.S. PATENT DOCUMENTS

| Patent/Publication No. | Date | Name |
|---|---|---|
| 10,767,599 B2 | 9/2020 | Dudar |
| 10,808,105 B2 | 10/2020 | Lesage |
| 11,118,036 B2 | 9/2021 | Isitman |
| 11,124,634 B2 | 9/2021 | Francois |
| 2003/0119995 A1 | 6/2003 | Hong |
| 2004/0063859 A1 | 4/2004 | Waddell |
| 2004/0092644 A1 | 5/2004 | Labauze |
| 2004/0122157 A1 | 6/2004 | Labauze |
| 2007/0037908 A1 | 2/2007 | Pille-Wolf |
| 2008/0161452 A1 | 7/2008 | York |
| 2008/0161460 A1 | 7/2008 | York |
| 2008/0161462 A1 | 7/2008 | York |
| 2008/0223494 A1 | 9/2008 | Amino |
| 2009/0176910 A1 | 7/2009 | Anbe |
| 2010/0132863 A1 | 6/2010 | Miki |
| 2010/0144946 A1 | 6/2010 | Costantini |
| 2010/0186868 A1 | 7/2010 | Sandstrom |
| 2010/0186869 A1 | 7/2010 | Sandstrom |
| 2010/0224301 A1 | 9/2010 | Sakamoto |
| 2011/0003932 A1 | 1/2011 | Steinhauser |
| 2011/0071245 A1 | 3/2011 | De-Riva Perez |
| 2011/0230593 A1 | 9/2011 | Kondo |
| 2011/0245398 A1 | 10/2011 | Hama |
| 2011/0275751 A1 | 11/2011 | Costantini |
| 2011/0290387 A1 | 12/2011 | Pennequin |
| 2011/0306700 A1 | 12/2011 | Belin |
| 2012/0016506 A1 | 1/2012 | Yokogawa |
| 2012/0085473 A1 | 4/2012 | Matsuo |
| 2012/0184658 A1 | 7/2012 | Miyazaki |
| 2012/0208919 A1 | 8/2012 | Kanz |
| 2012/0214903 A1 | 8/2012 | Masumoto |
| 2012/0214933 A1 | 8/2012 | Lopez |
| 2012/0234452 A1 | 9/2012 | Miyazaki |
| 2012/0252929 A1 | 10/2012 | Yang |
| 2012/0305159 A1 | 12/2012 | Sakamoto |
| 2012/0305828 A1 | 12/2012 | Gomi |
| 2012/0309865 A1 | 12/2012 | Lopez |
| 2012/0318424 A1 | 12/2012 | Lopitaux |
| 2013/0096248 A1 | 4/2013 | Thompson |
| 2013/0123387 A1 | 5/2013 | Kagawa |
| 2013/0139940 A1 | 6/2013 | Ito |
| 2013/0153110 A1 | 6/2013 | Miyazaki |
| 2013/0158185 A1 | 6/2013 | Thompson |
| 2013/0160910 A1 | 6/2013 | Hennebert |
| 2013/0165578 A1 | 6/2013 | Francik |
| 2013/0196085 A1 | 8/2013 | Voge |
| 2013/0267640 A1 | 10/2013 | Lopez |
| 2013/0274404 A1 | 10/2013 | Vasseur |
| 2013/0281609 A1 | 10/2013 | Steinhauser |
| 2013/0289165 A1 | 10/2013 | De Landtsheer |
| 2013/0292023 A1 | 11/2013 | Bergman |
| 2013/0296471 A1 | 11/2013 | Lesage |
| 2013/0310501 A1 | 11/2013 | Junling |
| 2013/0325336 A1 | 12/2013 | Dong |
| 2013/0338256 A1 | 12/2013 | Steiner |
| 2013/0345335 A1 | 12/2013 | Shibata |
| 2013/0345336 A1 | 12/2013 | Lopitaux |
| 2014/0107261 A1 | 4/2014 | Miyazaki |
| 2014/0135424 A1 | 5/2014 | Sandstrom |
| 2014/0135437 A1 | 5/2014 | Sandstrom |
| 2014/0155519 A1 | 6/2014 | Ringot |
| 2014/0171557 A1 | 6/2014 | Ringot |
| 2014/0213693 A1 | 7/2014 | Mabuchi |
| 2014/0213706 A1 | 7/2014 | Honda |
| 2014/0228480 A1 | 8/2014 | Shiraishi |
| 2014/0235751 A1 | 8/2014 | Lesage |
| 2014/0243448 A1 | 8/2014 | Lesage |
| 2014/0256858 A1 | 9/2014 | Bethea |
| 2014/0336330 A1 | 11/2014 | Costantini |
| 2014/0371346 A1 | 12/2014 | Saintigny |
| 2015/0005448 A1 | 1/2015 | Longchambon |
| 2015/0018449 A1 | 1/2015 | Hasegawa |
| 2015/0031790 A1 | 1/2015 | Obrecht |
| 2015/0087745 A1 | 3/2015 | Chekanov |
| 2015/0119491 A1 | 4/2015 | Hirabayashi |
| 2015/0159001 A1 | 6/2015 | Qu |
| 2015/0166773 A1 | 6/2015 | Choi |
| 2015/0183953 A1 | 7/2015 | Shiraishi |
| 2015/0183971 A1 | 7/2015 | Kawashima |
| 2015/0191047 A1 | 7/2015 | Kojima |
| 2015/0191585 A1 | 7/2015 | Null |
| 2015/0218305 A1 | 8/2015 | Washizu |
| 2015/0247027 A1 | 9/2015 | Kojima |
| 2015/0251491 A1 | 9/2015 | Zhao |
| 2015/0259516 A1 | 9/2015 | Mathey |
| 2015/0267045 A1 | 9/2015 | Huang |
| 2015/0283854 A1 | 10/2015 | Saintigny |
| 2015/0306921 A1 | 10/2015 | Hiraiwa |
| 2015/0314650 A1 | 11/2015 | Navarro-Losada |
| 2015/0315356 A1 | 11/2015 | Schnell |
| 2015/0322241 A1 | 11/2015 | Darnaud |
| 2015/0329696 A1 | 11/2015 | Miyazaki |
| 2015/0329704 A1 | 11/2015 | Miyazaki |
| 2015/0343843 A1 | 12/2015 | Cato |
| 2015/0353716 A1 | 12/2015 | Thuilliez |
| 2015/0360514 A1 | 12/2015 | Miyazaki |
| 2015/0368428 A1 | 12/2015 | Guy |
| 2015/0368438 A1 | 12/2015 | Schwartz |
| 2015/0376380 A1 | 12/2015 | Colvin |
| 2016/0053094 A1 | 2/2016 | Takeuchi |
| 2016/0053097 A1 | 2/2016 | Koda |
| 2016/0068666 A1 | 3/2016 | Nagase |
| 2016/0082787 A1 | 3/2016 | Boen |
| 2016/0090475 A1 | 3/2016 | Nakatani |
| 2016/0108201 A1 | 4/2016 | Nakashima |
| 2016/0108213 A1 | 4/2016 | Inoue |
| 2016/0115304 A1 | 4/2016 | Shafie |
| 2016/0159147 A1 | 6/2016 | Isitman |
| 2016/0229992 A1 | 8/2016 | Peters |
| 2016/0237225 A1 | 8/2016 | Bian |
| 2016/0237255 A1 | 8/2016 | Qu |
| 2016/0272796 A1 | 9/2016 | Washizu |
| 2016/0280007 A1* | 9/2016 | Cato ................ C08L 15/00 |
| 2016/0312015 A1 | 10/2016 | McDowell |
| 2016/0319116 A1 | 11/2016 | Labrunie |
| 2016/0339744 A1 | 11/2016 | Boley |
| 2017/0029605 A1 | 2/2017 | Masumoto |
| 2017/0037225 A1 | 2/2017 | Isitman |
| 2017/0088690 A1 | 3/2017 | Feldhues et al. |
| 2017/0107358 A1 | 4/2017 | Ambe |
| 2017/0114212 A1 | 4/2017 | Pompei |
| 2017/0121509 A1 | 5/2017 | Belin |
| 2017/0145194 A1 | 5/2017 | Hattori et al. |
| 2017/0145195 A1 | 5/2017 | Isitman |
| 2017/0158845 A1 | 6/2017 | Nakajima |
| 2017/0166732 A1 | 6/2017 | Isitman |
| 2017/0190888 A1 | 7/2017 | Pille-Wolf |
| 2017/0204256 A1 | 7/2017 | Labrunie |
| 2017/0204257 A1 | 7/2017 | Labrunie |
| 2017/0218187 A1 | 8/2017 | Ringot |
| 2017/0226331 A1 | 8/2017 | Ishino |
| 2017/0232795 A1 | 8/2017 | Isitman |
| 2017/0240722 A1 | 8/2017 | Randall |
| 2017/0240724 A1 | 8/2017 | Yamashiro |
| 2017/0240731 A1 | 8/2017 | Yamashiro |
| 2017/0247531 A1 | 8/2017 | Reuvekamp |
| 2017/0267027 A1 | 9/2017 | Kunisawa |
| 2017/0291450 A1 | 10/2017 | Izumo |
| 2017/0313860 A1 | 11/2017 | Takenaka |
| 2017/0327671 A1 | 11/2017 | Yokoyama |
| 2017/0334244 A1 | 11/2017 | Isitman |
| 2017/0341468 A1 | 11/2017 | Miyazaki |
| 2017/0342252 A1 | 11/2017 | Galizio |
| 2017/0349733 A1 | 12/2017 | Isitman et al. |
| 2017/0355836 A1 | 12/2017 | Yokoyama |
| 2017/0369682 A1 | 12/2017 | Srinivasan |
| 2017/0369685 A1 | 12/2017 | Yamashiro |
| 2018/0022904 A1 | 1/2018 | Weber |
| 2018/0030159 A1 | 2/2018 | Nakatani |
| 2018/0051163 A1 | 2/2018 | Kato |
| 2018/0056717 A1 | 3/2018 | Yang |
| 2018/0057669 A1 | 3/2018 | Nagase |
| 2018/0065413 A1 | 3/2018 | Sekine |
| 2018/0072100 A1 | 3/2018 | Sekine |

(56) References Cited

U.S. PATENT DOCUMENTS

| | | |
|---|---|---|
| 2018/0118896 A1 | 5/2018 | Tomisaki |
| 2018/0134078 A1 | 5/2018 | Sakai |
| 2018/0148566 A1 | 5/2018 | Rodewald |
| 2018/0179364 A1 | 6/2018 | Sekine |
| 2018/0186979 A1 | 7/2018 | Labrunie |
| 2018/0223082 A1 | 8/2018 | Lesage |
| 2018/0223083 A1 | 8/2018 | Lesage |
| 2018/0244808 A1 | 8/2018 | Uchiyama |
| 2018/0250985 A1 | 9/2018 | Maekawa |
| 2018/0258263 A1 | 9/2018 | Oshimo |
| 2018/0264882 A1 | 9/2018 | McDowell |
| 2018/0264884 A1 | 9/2018 | Sato |
| 2018/0265601 A1 | 9/2018 | Colvin |
| 2018/0282531 A1 | 10/2018 | Belin |
| 2018/0282588 A1 | 10/2018 | Arigo |
| 2018/0291190 A1 | 10/2018 | Kato |
| 2018/0304685 A1 | 10/2018 | Sakurai |
| 2018/0305469 A1 | 10/2018 | Matsumoto |
| 2018/0340055 A1 | 11/2018 | De Gaudemaris |
| 2019/0002671 A1 | 1/2019 | Sato |
| 2019/0031864 A1 | 1/2019 | Kato |
| 2019/0055380 A1 | 2/2019 | Sekine |
| 2019/0061426 A1 | 2/2019 | Sekine |
| 2019/0061427 A1 | 2/2019 | Sekine |
| 2019/0062531 A1 | 2/2019 | Pille-Wolf |
| 2019/0062538 A1 | 2/2019 | Miyazaki |
| 2019/0071560 A1 | 3/2019 | Sekine |
| 2019/0085158 A1 | 3/2019 | Sekine |
| 2019/0092937 A1 | 3/2019 | Pan |
| 2019/0134930 A1 | 5/2019 | Randall et al. |
| 2019/0144654 A1 | 5/2019 | Nair |
| 2019/0169407 A1 | 6/2019 | Recker |
| 2019/0184745 A1 | 6/2019 | Oshimo |
| 2019/0184746 A1 | 6/2019 | Oshimo |
| 2019/0185644 A1 | 6/2019 | Watanabe |
| 2019/0185645 A1 | 6/2019 | Oshimo |
| 2019/0185646 A1 | 6/2019 | Recker |
| 2019/0193464 A1 | 6/2019 | Hamamura |
| 2019/0194428 A1 | 6/2019 | Recker |
| 2019/0194430 A1 | 6/2019 | Morishita |
| 2019/0203021 A1 | 7/2019 | Kyo |
| 2019/0225776 A1 | 7/2019 | Iwakuni |
| 2019/0241017 A1 | 8/2019 | Jung |
| 2019/0256691 A1 | 8/2019 | Castanon |
| 2020/0123351 A1 | 4/2020 | Francois |
| 2020/0181369 A1 | 6/2020 | Yoshizawa |
| 2020/0317890 A1 | 10/2020 | Hatanaka |
| 2021/0032389 A1 | 2/2021 | Blok |
| 2021/0229494 A1 | 7/2021 | Whyte |
| 2021/0277212 A1 | 9/2021 | Takagi et al. |
| 2021/0300115 A1 | 9/2021 | Whyte |
| 2021/0300117 A1 | 9/2021 | Coffman |
| 2021/0300118 A1 | 9/2021 | Unger |
| 2022/0235207 A1 | 7/2022 | Placke |
| 2023/0130953 A1 | 4/2023 | Pan et al. |

FOREIGN PATENT DOCUMENTS

| | | | | |
|---|---|---|---|---|
| CN | 107207795 A | 9/2017 | | |
| CN | 105189145 B | 4/2018 | | |
| EP | 2141029 A1 | 1/2010 | | |
| EP | 2213477 A1 | 8/2010 | | |
| EP | 2412731 A1 | 2/2012 | | |
| EP | 2643400 A1 | 10/2013 | | |
| EP | 2489698 B1 | 7/2014 | | |
| EP | 3031620 A1 | 6/2016 | | |
| EP | 2194090 B1 | 8/2016 | | |
| EP | 2440611 B1 | 9/2016 | | |
| EP | 2585525 B1 | 10/2016 | | |
| EP | 3083769 A1 | 10/2016 | | |
| EP | 3109065 A1 | 12/2016 | | |
| EP | 3135500 A1 * | 3/2017 | ........... | B60C 1/0016 |
| EP | 3159181 A1 | 4/2017 | | |
| EP | 3255089 A1 | 12/2017 | | |
| EP | 3299413 A1 | 3/2018 | | |
| EP | 3511179 A1 | 7/2019 | | |
| EP | 3608126 A1 | 2/2020 | | |
| EP | 2643401 A1 | 10/2020 | | |
| EP | 3915807 A1 | 12/2021 | | |
| FR | 2940302 A1 | 6/2010 | | |
| FR | 2969629 A1 | 6/2012 | | |
| FR | 2974808 A1 | 11/2012 | | |
| FR | 3015495 B1 | 6/2015 | | |
| FR | 3039557 A1 | 2/2017 | | |
| JP | 2007-326942 A | 2/2007 | | |
| JP | 2009263587 A | 11/2009 | | |
| JP | 2010514860 A | 5/2010 | | |
| JP | 4849176 B2 | 1/2012 | | |
| JP | 2012-531486 A | 12/2012 | | |
| JP | 2013510939 A | 3/2013 | | |
| JP | 2013136746 A | 7/2013 | | |
| JP | 5670558 B2 | 9/2013 | | |
| JP | 2013-544935 A | 12/2013 | | |
| JP | 2013-544936 A | 12/2013 | | |
| JP | 2014503619 A | 2/2014 | | |
| JP | 2014518913 A | 8/2014 | | |
| JP | 5719878 B2 | 12/2014 | | |
| JP | 5719879 B2 | 12/2014 | | |
| JP | 5719880 B2 | 12/2014 | | |
| JP | 5719881 B2 | 12/2014 | | |
| JP | 2015000924 A | 1/2015 | | |
| JP | 2015007227 A | 1/2015 | | |
| JP | 2015507054 A | 3/2015 | | |
| JP | 5719875 B2 | 5/2015 | | |
| JP | 5719876 B2 | 5/2015 | | |
| JP | 5719877 B2 | 5/2015 | | |
| JP | 2015528844 A | 10/2015 | | |
| JP | 2015196824 A | 11/2015 | | |
| JP | 2016-504466 A | 2/2016 | | |
| JP | 2016089118 A | 5/2016 | | |
| JP | 6211025 B2 | 8/2016 | | |
| JP | 2017-031432 A | 2/2017 | | |
| JP | 2017-132984 A | 8/2017 | | |
| JP | 2018-502980 A | 2/2018 | | |
| JP | 2018-030993 A | 3/2018 | | |
| JP | 2018083944 A | 5/2018 | | |
| JP | 2018123260 A | 8/2018 | | |
| JP | 20120277189 A | 1/2019 | | |
| JP | 2021521292 A | 8/2021 | | |
| JP | 2021523260 A | 9/2021 | | |
| JP | 2021523959 A | 9/2021 | | |
| KR | 20150087507 A | 7/2015 | | |
| KR | 101817435 B1 | 1/2018 | | |
| WO | 9909036 A1 | 2/1999 | | |
| WO | 2011114990 A1 | 9/2011 | | |
| WO | 2013077019 A1 | 5/2013 | | |
| WO | 2013-099324 A1 | 7/2013 | | |
| WO | 2015174229 A1 | 11/2015 | | |
| WO | 2016002506 A1 | 1/2016 | | |
| WO | 2016031476 A1 | 3/2016 | | |
| WO | 2016084984 A1 | 6/2016 | | |
| WO | 2016115132 A1 | 7/2016 | | |
| WO | 2016195050 A1 | 12/2016 | | |
| WO | 2017038001 A1 | 3/2017 | | |
| WO | 2017083082 A1 | 5/2017 | | |
| WO | 2017104781 A1 | 6/2017 | | |
| WO | 2017109400 A1 | 6/2017 | | |
| WO | WO-2017095377 A1 * | 6/2017 | ............... | B60C 1/00 |
| WO | 2017-199688 A1 | 11/2017 | | |
| WO | 2017189718 A1 | 11/2017 | | |
| WO | 2018002537 A1 | 1/2018 | | |
| WO | 2018004579 A1 | 1/2018 | | |
| WO | 2018056382 A1 | 3/2018 | | |
| WO | 2018079801 A1 | 5/2018 | | |
| WO | 2018079803 A1 | 5/2018 | | |
| WO | 2018203533 A1 | 11/2018 | | |
| WO | 2019-213185 A1 | 11/2019 | | |
| WO | 2019-213186 A1 | 11/2019 | | |
| WO | 2019-213226 A1 | 11/2019 | | |
| WO | 2019-213229 A1 | 11/2019 | | |
| WO | 2019-213233 A1 | 11/2019 | | |
| WO | 2020-032053 A1 | 2/2020 | | |
| WO | 2020-243304 A1 | 12/2020 | | |
| WO | 2020-243308 A1 | 12/2020 | | |

(56) References Cited

FOREIGN PATENT DOCUMENTS

| WO | 2020-243311 A1 | 12/2020 |
| WO | 2022-076391 A1 | 4/2022 |
| WO | 2024-182408 A1 | 9/2024 |
| WO | 2024-182417 A1 | 9/2024 |
| WO | 2025-038688 A1 | 2/2025 |

OTHER PUBLICATIONS

Basak, Ganesh C. et al., "The role of tackifiers on the auto-adhesion behavior of EPDM rubber," Journal of Materials Science, Apr. 2012, pp. 3166-3176, vol. 47, Issue 7.
Budene 1207/1208 Technical Data Sheet, Goodyear Chemical, Sep. 17, 2019, 1 pg.
European Search Report; Corresponding European Application No. 19795849; Dec. 3, 2021; 9 pp.
European Search Report; Corresponding European Application No. 19796674; Dec. 1, 2021; 11 pp.
European Search Report; Corresponding European Application No. 19797076; Nov. 29, 2021; 9 pp.
European Search Report; Corresponding European Application No. 19797092; Nov. 29, 2021; 6 pp.
International Preliminary Report on Patentability; Corresponding PCT Application No. PCT/US2019/030094; Issue Date of Report Nov. 10, 2020. 8 pp.
International Preliminary Report on Patentability; Corresponding PCT Application No. PCT/US2019/030095; Issue Date of Report Nov. 10, 2020; 9 pp.
International Preliminary Report on Patentability; Corresponding PCT Application No. PCT/US2019/030155; Issue Date of Report Nov. 10, 2020; 9 pp.
International Preliminary Report on Patentability; Corresponding PCT Application No. PCT/US2019/030162; Issue Date of Report Nov. 10, 2020; 8 pp.
International Preliminary Report on Patentability; Corresponding PCT Application No. PCT/US2019/030170; Issue Date of Report Nov. 10, 2020; 9 pp.
International Preliminary Report on Patentability; Corresponding PCT Application No. PCT/US2020/034926; Issue Date of Report Nov. 16, 2021; 6 pp.
International Preliminary Report on Patentability; Corresponding PCT Application No. PCT/US2020/034930; Issue Date of Report Nov. 16, 2021; 6 pp.
International Preliminary Report on Patentability; Corresponding PCT Application No. PCT/US2020/034934; Issue Date of Report Nov. 16, 2021; 5 pp.
Kwon, Yongkyong, International Search Report with Written Opinion from PCT/US2019/030094, 13 pp. (Aug. 9, 2019).
Kwon, Yongkyong, International Search Report with Written Opinion from PCT/US2019/030095, 14 pp. (Aug. 12, 2019).
Kwon, Yongkyong, International Search Report with Written Opinion from PCT/US2019/030155, 14 pp. (Aug. 14, 2019).
Kwon, Yongkyong, International Search Report with Written Opinion from PCT/US2019/030162, 13 pp. (Aug. 12, 2019).
Kwon, Yongkyong, International Search Report with Written Opinion from PCT/US2019/030170, 14 pp. (Aug. 14, 2019).
Third Party Submission with English translation submitted in Japanese Application No. 2020-561702, Feb. 20, 2023, 21 pp.
Third Party Submission with English translation submitted in Japanese Application No. 2020-561702, Jun. 2, 2022, 43 pp.
Third Party Submission with English translation submitted in Japanese Application No. 2020-561864, Apr. 28, 2022, 58 pp.
Third Party Submission with English translation submitted in Japanese Application No. 2020-561864, Feb. 20, 2023, 15 pp.
Third Party Submission with English translation submitted in Japanese Application No. 2020-561874, Feb. 20, 2023, 14 pp.
Third Party Submission with English translation submitted in Japanese Application No. 2020-561874, Jun. 2, 2022, 51 pp.
Third Party Submission with English translation submitted in Japanese Application No. 2020-561915, Mar. 29, 2023, 35 pp.
Third Party Submission with English translation submitted in Japanese Application No. 2020-561915, Sep. 5, 2022, 46 pp.
Third Party Submission with English translation submitted in Japanese Application No. 2021-570145, May 23, 2023, 55 pp.
Third Party Submission with English translation submitted in Japanese Application No. 2021-570149, Mar. 13, 2023, 15 pp.
Third Party Submission with English translation submitted in Japanese Application No. 2021-570839, Mar. 7, 2023, 10 pp.
Third Party Submission with English translation submitted in Japanese Application No. 2021-570149, Feb. 6, 2024, 49 pp.
Kuraray "Liquid Rubber" brochure, copyright 2023, dated Feb. 2023, 16 pages.
Baekelmans, Didier, International Search Report with Written Opinion from PCT/US2021/053545, 3 pp. (Jan. 21, 2022).
International Preliminary Report On Patentability; Corresponding PCT Application No. PCT/US2021/053545; Authorized Officer Cecile Chatel; Issue Date of Report 2023-28-23; 5 pp.
Escorez 5340 Tackifying Resin Data Sheet, by ExxonMobil, effective date Apr. 20, 2020 (2 pages).
Third Party Submission with English translation submitted in Japanese Application No. 2020-561702, Oct. 3, 2023, 20 pp.
Third Party Submission with English translation submitted in Japanese Application No. 2020-561915, Oct. 19, 2023, 18 pp.
Third Party Submission with English translation submitted in Japanese Application No. 2020-570839, Nov. 7, 2023, 14 pp.
Third Party Submission with English translation submitted in Japanese Application No. 2021-570149, Nov. 1, 2023, 14 pp.
Third Party Submission with English translation submitted in Japanese Application No. 2022-136348, Dec. 15, 2023, 14 pp.
International Search Report and Written Opinion for PCT application No. PCT/US2024/017504, mailed Jun. 3, 2024, 9 pages.
International Search Report and Written Opinion for PCT application No. PCT/US2024/017514, mailed Jun. 4, 2024, 10 pages.
International Search Report and Written Opinion for PCT application No. PCT/US2024/042198, mailed Dec. 10, 2024, 11 pages.

* cited by examiner

TIRE TREAD RUBBER COMPOSITION AND RELATED METHODS

This application is a national stage application of PCT/US2020/034934 filed on May 28, 2020, which claims the benefit of U.S. Provisional Application Ser. No. 62/854,106 filed on May 29, 2019, all of which are incorporated herein by reference in their entirety.

FIELD

The present application is directed to tire tread rubber compositions and related methods.

BACKGROUND

Tires comprise many components including a road-contacting tread. The particular ingredients used to prepare the rubber composition which comprises the tire tread may vary. Formulation of tire tread rubber compositions is a complex science since changes to the formulation which result in an improvement in one property (e.g., wet performance) may result in deterioration of another property (e.g., dry traction).

SUMMARY

Disclosed herein are rubber compositions for tire treads and related methods.

In a first embodiment, a tire tread rubber composition is disclosed. The composition is made of ingredients comprising: (a) 100 parts of an elastomer component comprising (i) 70-85 parts of polybutadiene having a cis bond content of at least 95% and a Tg of less than −101° C., (ii) 10-25 parts of at least one styrene-butadiene rubber, preferably having a Tg of less than −40° C., and (iii) 10-20 parts of natural rubber, polyisoprene, or a combination thereof; (b) at least one reinforcing silica filler in an amount of 101-150 phr, preferably having a surface area of about 150 to about 300 m$^2$/g; (c) no more than 20 phr, preferably no more than 15 phr of carbon black filler; (d) 30-50 phr of at least one hydrocarbon resin having a Tg of about 30 to about 50° C.; (e) 10-30 phr of liquid plasticizer; and (f) a cure package, wherein the total amount of (d) and (e) is at least 40 phr, preferably at least 50 phr.

In a second embodiment, a tire tread rubber composition is disclosed. The composition is made of ingredients comprising: (a) 100 parts of an elastomer component comprising (i) about 70 to about 80 parts of polybutadiene having a cis bond content of at least 95% and a Tg of less than −101° C., (ii) about 10 to about 20 parts of at least one styrene-butadiene rubber, preferably having a Tg of less than −40° C., and (iii) about 15 to about 25 parts of natural rubber, polyisoprene, or a combination thereof; (b) about 110 to about 130 phr of at least one reinforcing silica filler, preferably having a surface area of about 150 to about 300 m$^2$/g; (c) no more than about 10 phr of carbon black filler; (d) about 35 to about 45 phr of at least one hydrocarbon resin having a Tg of about 30 to about 50° C.; (e) about 15 to about 25 phr of liquid plasticizer; and (f) a cure package, wherein the total amount of (d) and (e) is at least about 50 phr.

In a third embodiment, a method for providing a tire tread is provided. More specifically, the method is for providing a tire tread having improved dry handling performance while maintaining wet traction performance and wear by utilizing a tire tread rubber composition made of ingredients comprising: (a) 100 parts of an elastomer component comprising (i) 70-85 parts of polybutadiene having a cis bond content of at least 95% and a Tg of less than −101° C., (ii) 10-25 parts of at least one styrene-butadiene rubber, preferably having a Tg of less than −40° C., and (iii) 10-20 parts of natural rubber, polyisoprene, or a combination thereof; (b) at least one reinforcing silica filler in an amount of 101-150 phr, preferably having a surface area of about 150 to about 300 m$^2$/g; (c) no more than 20 phr, preferably no more than 15 phr of carbon black filler; (d) 30-50 phr of at least one hydrocarbon resin having a Tg of about 30 to about 50° C.; (e) 10-30 phr of liquid plasticizer; and (f) a cure package, wherein the total amount of (d) and (e) is at least 40 phr, preferably at least 50 phr.

DETAILED DESCRIPTION

Disclosed herein are rubber compositions for tire treads and related methods.

In a first embodiment, a tire tread rubber composition is disclosed. The composition is made of ingredients comprising: (a) 100 parts of an elastomer component comprising (i) 70-85 parts of polybutadiene having a cis bond content of at least 95% and a Tg of less than −101° C., (ii) 10-25 parts of at least one styrene-butadiene rubber, preferably having a Tg of less than −40° C., and (iii) 10-20 parts of natural rubber, polyisoprene, or a combination thereof; (b) at least one reinforcing silica filler in an amount of 101-150 phr, preferably having a surface area of about 150 to about 300 m$^2$/g; (c) no more than 20 phr, preferably no more than 15 phr of carbon black filler; (d) 30-50 phr of at least one hydrocarbon resin having a Tg of about 30 to about 50° C.; (e) 10-30 phr of liquid plasticizer; and (f) a cure package, wherein the total amount of (d) and (e) is at least 40 phr, preferably at least 50 phr.

In a second embodiment, a tire tread rubber composition is disclosed. The composition is made of ingredients comprising: (a) 100 parts of an elastomer component comprising (i) about 70 to about 80 parts of polybutadiene having a cis bond content of at least 95% and a Tg of less than −101° C., (ii) about 10 to about 20 parts of at least one styrene-butadiene rubber, preferably having a Tg of less than −40° C., and (iii) about 15 to about 25 parts of natural rubber, polyisoprene, or a combination thereof; (b) about 110 to about 130 phr of at least one reinforcing silica filler, preferably having a surface area of about 150 to about 300 m$^2$/g; (c) no more than about 10 phr of carbon black filler; (d) about 35 to about 45 phr of at least one hydrocarbon resin having a Tg of about 30 to about 50° C.; (e) about 15 to about 25 phr of liquid plasticizer; and (f) a cure package, wherein the total amount of (d) and (e) is at least about 50 phr.

In a third embodiment, a method for providing a tire tread is provided. More specifically, the method is for providing a tire tread having improved dry handling performance while maintaining wet traction performance and wear by utilizing a tire tread rubber composition made of ingredients comprising: (a) 100 parts of an elastomer component comprising (i) 70-85 parts of polybutadiene having a cis bond content of at least 95% and a Tg of less than −101° C., (ii) 10-25 parts of at least one styrene-butadiene rubber, preferably having a Tg of less than −40° C., and (iii) 10-20 parts of natural rubber, polyisoprene, or a combination thereof; (b) at least one reinforcing silica filler in an amount of 101-150 phr, preferably having a surface area of about 150 to about 300 m$^2$/g; (c) no more than 20 phr, preferably no more than 15 phr of carbon black filler; (d) 30-50 phr of at least one hydrocarbon resin having a Tg of about 30 to about 50° C.;

(e) 10-30 phr of liquid plasticizer; and (f) a cure package, wherein the total amount of (d) and (e) is at least 40 phr, preferably at least 50 phr.

Definitions

The terminology as set forth herein is for description of the embodiments only and should not be construed as limiting the invention as a whole.

As used herein, the term "majority" refers to more than 50%.

As used herein, the abbreviation Mn is used for number average molecular weight.

As used herein, the abbreviation Mp is used for peak molecular weight.

As used herein, the abbreviation Mw is used for weight average molecular weight.

Unless otherwise indicated herein, the term "Mooney viscosity" refers to the Mooney viscosity, $ML_{1+4}$. As those of skill in the art will understand, a rubber composition's Mooney viscosity is measured prior to vulcanization or curing.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, the term "phr" means parts per one hundred parts rubber. The one hundred parts rubber is also referred to herein as 100 parts of an elastomer component.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein, the term "tread," refers to both the portion of a tire that comes into contact with the road under normal inflation and load as well as any subtread.

Tire Tread Rubber Composition

As mentioned above, the first and second embodiments disclosed herein are directed to tire tread rubber compositions made of specified ingredients and the third embodiment disclosed herein is directed to a method of providing a tire tread by utilizing a tire tread rubber composition prepared from specified ingredients. The subject rubber compositions are used in preparing treads for tires, generally by a process which includes forming of a tread pattern by molding and curing one of the subject rubber compositions. Thus, the tire treads will contain a cured form of one of the tire tread rubber compositions. The tire tread rubber compositions may be present in the form of a tread which has been formed but not yet incorporated into a tire and/or they may be present in a tread which forms part of a tire.

According to the first-third embodiments disclosed herein, the Tg of the overall rubber composition may vary. The Tg of the overall rubber composition may be referred to as a compound Tg or as a rubber composition Tg. In certain embodiments of the first-third embodiments, the rubber composition has a compound Tg of −55 to −75° C. (e.g., −55, −56, −57, −58, −59, −60, −61, −62, −63, −64, −65, −66, −67, −68, −69, or −70° C.), preferably −60 to −70° C. (e.g., −60, −61, −62, −63, −64, −65, −66, −67, −68, −69, −70, −71, −72, −73, −74, or −75° C.). The compound Tg of a rubber composition can be measured using a dynamic mechanical thermal spectrometer (such as the Gabo instrument described below, operating in tension mode) generally following the guidelines of ASTM D5992-96 (2011) and using a temperature sweep (from −70 to 65° C.), under specified test conditions (i.e., frequency 52 Hz, static strain of 6%, dynamic strain of 0.1%, sample geometry 4.75 mm wide×29 mm long×2 mm deep), with the measurement made on the sample after curing for 15 minutes at 170° C., and using a vibratory method to estimate the Tg from the curve that results.

Elastomer Component

As mentioned above, according to the first-third embodiments, the tire tread rubber composition is made of ingredients comprising (including) 100 parts of an elastomer component. The ingredients of the elastomer component include polybutadiene; styrene-butadiene rubber; and natural rubber, polyisoprene, or a combination thereof. The total amount of 100 parts of elastomer or rubber is used so that the amount of other ingredients may be listed in amounts of phr or the number of parts per hundred parts of rubber (or 100 parts of the elastomer component). As a non-limiting example, for a rubber composition containing 15 parts of styrene-butadiene rubber, 70 parts of polybutadiene, 15 parts of natural rubber, and 110 parts of reinforcing silica filler, the amount of silica filler can also be described as 110 phr.

As mentioned above, according to the first embodiment, the 100 parts of elastomer component comprises (includes) (i) 70-85 parts (e.g., 70, 71, 72, 73, 74, 75, 76, 77, 78, 79, 80, 81, 82, 83, 84, or 85 parts) of polybutadiene having a cis bond content of at least 95% and a Tg of less than −101° C., (ii) 10-25 parts (e.g., 10, 11, 12, 13, 14, 15, 16, 17, 18, 19, 20, 21, 22, 23, 24, or 25 parts) of at least one styrene-butadiene rubber, preferably having a Tg of less than −40° C., and (iii) 10-20 parts (e.g., 10, 11, 12, 13, 14, 15, 16, 17, 18, 19, or 20 parts) of natural rubber, polyisoprene, or a combination thereof. In certain embodiments of the first embodiment, the 100 parts of elastomer component comprises (includes) as (i) 70-80 parts, 71-85 parts, 71-84 parts, 71-83 parts, 71-82 parts, 71-81 parts, 71-80 parts of polybutadiene having a cis bond content of at least 95% and a Tg of less than −101° C. In certain embodiments of the first embodiment, the Tg of the polybutadiene rubber (i) is −101 to −110° C. (e.g., −101, −102, −103, −104, −105, −106, −107, −108, −109, or −110° C.). In certain embodiments of the first embodiment, the 100 parts of elastomer component comprises (includes) as (ii) 10-20 parts, 11-24 parts, 11-23 parts, 11-22 parts, 11-21 parts, or 11-20 parts of at least one styrene-butadiene rubber, preferably having a Tg of less than −40° C. In certain preferred embodiments of the first embodiment, the styrene-butadiene rubber (ii) has a Tg of about −40 to about −80° C., −40 to −80° C. (e.g., −40, −45, −50, −55, −60, −65, −70, −75, or −80° C.), more preferably −50 to −75° C. (e.g., −50, −52, −54, −55, −56, −58, −60, −62, −64, −65, −66, −68, −70, −72, −74, or −75° C.). In certain preferred embodiments of the first embodiment, the styrene-butadiene rubber of (ii) is functionalized with a silica-reactive functional group. In certain preferred embodiments of the first embodiment, only one rubber is used for (ii) which is a functionalized styrene-butadiene rubber having a silica-reactive functional group. In other embodiments of the first embodiment, the styrene-butadiene rubber of (ii) is not functionalized.

As mentioned above, according to the second embodiment, the 100 parts of elastomer component comprises (includes) (i) about 70 to about 80 parts or 70-80 parts (e.g., 70, 71 72, 73, 74, 75, 76, 77, 78, 79 or 80 parts) of polybutadiene having a cis bond content of at least 95% and a Tg of less than −101° C., (ii) about 10 to about 20 parts or 10-20 parts (e.g., 10, 11, 12, 13, 14, 15, 16, 17, 18, 19, or 20 parts) of at least one styrene-butadiene rubber, preferably having a Tg of less than −40° C., and (iii) about 15 to about 25 parts or 15-25 parts (e.g., 15, 16, 17, 18, 19, 20, 21, 22, 23, 24, or 25 parts) of natural rubber, polyisoprene, or a combination thereof. In certain embodiments of the second embodiment, the 100 parts of elastomer component comprises (includes) as (i) 71-80 parts, 71-79 parts, 71-78 parts, 70-79 parts, or 70-78 parts of polybutadiene having a cis bond content of at least 95% and a Tg of less than −101° C. In certain embodiments of the second embodiment, the Tg of the polybutadiene rubber (i) is −101 to −110° C. (e.g., −101, −102, −103, −104, −105, −106, −107, −108, −109, or −110° C.). In certain embodiments of the second embodiment, the 100 parts of elastomer component comprises (includes) as (ii) 15-24 parts, 15-23 parts, 15-22 parts, 15-21 parts, or 15-20 parts of at least one styrene-butadiene rubber, preferably having a Tg of less than −40° C. In certain preferred embodiments of the second embodiment, the styrene-butadiene rubber (ii) has a Tg of about −40 to about −80° C., −40 to −80° C. (e.g., −40, −45, −50, −55, −60, −65, −70, −75, or −80° C.), or more preferably −50 to −75° C. (e.g., −50, −52, −54, −55, −56, −58, −60, −62, −64, −65, −66, −68, −70, −72, −74, or −75° C.). In certain preferred embodiments of the second embodiment, the styrene-butadiene rubber of (ii) is functionalized with a silica-reactive functional group. In certain preferred embodiments of the second embodiment, only one rubber is used for (ii) which is a functionalized styrene-butadiene rubber having a silica-reactive functional group. In other embodiments of the second embodiment, the styrene-butadiene rubber of (ii) is not functionalized.

As mentioned above, according to the third embodiment, the 100 parts of elastomer component comprises (includes) (i) 70-85 parts (e.g., 70, 71, 72, 73, 74, 75, 76, 77, 78, 79, 80, 81, 82, 83, 84, or 85 parts) of polybutadiene having a cis bond content of at least 95% and a Tg of less than −101° C., (ii) 10-25 parts (e.g., 10, 11, 12, 13, 14, 15, 16, 17, 18, 19, 20, 21, 22, 23, 24, or 25 parts) of at least one styrene-butadiene rubber, preferably having a Tg of less than −40° C., and (iii) 10-20 parts (e.g., 10, 11, 12, 13, 14, 15, 16, 17, 18, 19, or 20 parts) of natural rubber, polyisoprene, or a combination thereof. In certain embodiments of the third embodiment, the 100 parts of elastomer component comprises (includes) as (i) 70-80 parts, 71-85 parts, 71-84 parts, 71-83 parts, 71-82 parts, 71-81 parts, or 71-80 parts of polybutadiene having a cis bond content of at least 95% and a Tg of less than −101° C. In certain embodiments of the third embodiment, the Tg of the polybutadiene rubber (i) is −101 to −110° C. (e.g., −101, −102, −103, −104, −105, −106, −107, −108, −109, or −110° C.). In certain embodiments of the third embodiment, the 100 parts of elastomer component comprises (includes) as (ii) 10-20 parts, 11-24 parts, 11-23 parts, 11-22 parts, 11-21 parts, or 11-20 parts of at least one styrene-butadiene rubber, preferably having a Tg of less than −40° C. In certain preferred embodiments of the third embodiment, the styrene-butadiene rubber (ii) has a Tg of about −40 to about −80° C., −40 to −80° C. (e.g., −40, −45, −50, −55, −60, −65, −70, −75, or −80° C.), more preferably −50 to −75° C. (e.g., −50, −52, −54, −55, −56, −58, −60, −62, −64, −65, −66, −68, −70, −72, −74, or −75° C.). In certain preferred embodiments of the third embodiment, the styrene-butadiene rubber of (ii) is functionalized with a silica-reactive functional group. In certain preferred embodiments of the third embodiment, only one rubber is used for (ii) which is a functionalized styrene-butadiene rubber having a silica-reactive functional group. In other embodiments of the third embodiment, the styrene-butadiene rubber of (ii) is not functionalized.

The Tg values referred to herein for elastomers represent a Tg measurement made upon the elastomer without any oil-extension. In other words, for an oil-extended elastomer, the Tg values above refer to the Tg prior to oil extension or to a non-oil-extended version of the same elastomer. Elastomer or polymer Tg values may be measured using a differential scanning calorimeter (DSC) instrument, such as manufactured by TA Instruments (New Castle, Delaware), where the measurement is conducted using a temperature elevation of 10° C./minute after cooling at −120° C. Thereafter, a tangent is drawn to the base lines before and after the jump of the DSC curve. The temperature on the DSC curve (read at the point corresponding to the middle of the two contact points) can be used as Tg.

In certain embodiments of the first-third embodiments, the average Tg of the elastomer component is −80 to −105° C. (e.g., −80, −82, −84, −85, −86, −88, −90, −92, −94, −95, −96, −98, −100, −102, −104, or −105° C.), preferably −85 to −105° C. (e.g., −85, −87, −89, −90, −91, −93, −95, −97, −99, −−100, −101, −103, or −105° C.), more preferably −90 to −100° C. (e.g., −90, −91, −92, −93, −94, −95, −96, −98, −99, or −100° C.). The average Tg of the elastomer component can be calculated using the Tg of each rubber present in the 100 parts of elastomer component and accounting for their relative weight percentage. When one (or more) of the rubbers is oil-extended, only the amount of rubber (i.e., excluding any amount of oil) is utilized in calculating the average Tg of the elastomer component. When one (or more) of the rubbers is oil-extended, the Tg of the non-oil-extended rubber is utilized in calculating the average Tg of the elastomer component.

Styrene-Butadiene Rubber(s) of (i)

According to the first-third embodiments, the styrene monomer content (i.e., weight percent of the polymer chain comprising styrene units as opposed to butadiene units) of the styrene-butadiene rubber(s) used for (ii) may vary. In certain embodiments of the first-third embodiments, the styrene content of the styrene-butadiene rubber(s) used for (ii) have a styrene monomer content of no more than about 25%, no more than 25% (e.g., 25%, 20%, 15%, 10%, 5%, 25-5%, 25-10%, etc.), preferably no more than about 15% or no more than 15% (e.g., 15%, 14%, 13%, 12%, 11%, 10%, 9%, 8%, 7%, 6%, 5%, 15-5%, 15-10%, etc.).

According to the first-third embodiments, the vinyl bond content (i.e., 1,2-microstructure) of the styrene-butadiene rubber(s) used for (ii) may vary. In certain embodiments of the first-third embodiments, the styrene-butadiene rubber(s) used for (ii) may have a vinyl bond content of about 20 to about 60%, 20-60% (e.g., 20%, 25%, 30%, 35%, 40%, 45%, 50%, 55% or 60%), about 25 to about 55%, 25-55% (e.g., 25%, 30%, 35%, 40%, 45%, 50%, or 55%), about 30 to about 50% or 30-40% (e.g., 30%, 32%, 34%, 35%, 36%, 38%, or 40%). The styrene-butadiene rubber(s) used for (ii) may have a vinyl bond content within one of the foregoing ranges, optionally in combination with one or more of the Mw, Mn, and/or Mw/Mn ranges discussed below, and in certain embodiments optionally in combination with one of the styrene monomer contents discussed above. The vinyl bond contents referred to herein should be understood as being for the overall vinyl bond content in the SBR polymer chain rather than of the vinyl bond content in the butadiene portion of the SBR polymer chain, and can be determined by $H^1$-NMR and $C^{13}$-NMR (e.g., using a 300 MHz Gemini 300 NMR Spectrometer System (Varian)).

As mentioned above, according to preferred embodiments of the first-third embodiments, the styrene-butadiene rubber of (ii) is functionalized with a silica-reactive functional group. The particular functionalizing group present (and correspondingly the compound used to provide the functionalizing group) may vary. One or more than one type of silica-reactive functional group may be utilized for each rubber. The silica-reactive functional group may be present at the head of the polymer, at the tail of the polymer, along the backbone of the polymer chain, or a combination thereof. Functional groups present at one or both terminals of a polymer are generally the result of the use of a functional initiator, a functional terminator, or both. Alternatively or additionally, the silica-reactive functional group may be present as a result of coupling of multiple polymer chains using a coupling agent (as described below). Non-limiting examples of silica-reactive functional groups generally include nitrogen-containing functional groups, silicon-containing functional groups, oxygen- or sulfur-containing functional groups, and metal-containing functional groups.

Non-limiting examples of nitrogen-containing functional groups that can be utilized in certain embodiments of the first-third embodiments as a silica-reactive functional group in the styrene-butadiene rubber of (ii) include, but are not limited to, a substituted or unsubstituted amino group, an amide residue, an isocyanate group, an imidazolyl group, an indolyl group, an imino group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments of the first-third embodiments, the styrene-butadiene rubber of (ii) comprises at least one silica-reactive functional group selected from the foregoing list of nitrogen-containing functional groups.

In certain embodiments of the first-third embodiments, the styrene-butadiene rubber of (ii) includes a silica-reactive functional group from a compound which includes nitrogen in the form of an imino group. Such an imino-containing functional group may be added by reacting the active terminal of a polymer chain with a compound having the following formula (I):

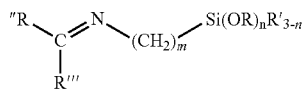

wherein R, R', R", and R'" each independently are selected from a group having 1 to 18 carbon atoms (e.g., 1, 2, 3, 4, 5, 6, 7, 8, 9, 10, 11, 12, 13, 14, 15, 16, 17, or 18 carbon atoms) selected from the group consisting of an alkyl group, an allyl group, and an aryl group; m and n are integers of 1 to 20 (e.g., 1, 2, 3, 4, 5, 6, 7, 8, 9, 10, 11, 12, 13, 14, 15, 16, 17, 18, 19, or 20) and 1 to 3 (1, 2, or 3), respectively. Each of R, R', R", and R'" are preferably hydrocarbyl and contain no heteroatoms. In certain embodiments of the first-third embodiments, each R and R' are independently selected from an alkyl group having 1 to 6 carbon atoms (e.g., 1, 2, 3, 4, 5, or 6 carbon atoms), preferably 1 to 3 carbon atoms (e.g., 1, 2, or 3 carbon atoms). In certain embodiments of the first-third embodiments, m is an integer of 2 to 6 (e.g., 2, 3, 4, 5, or 6), preferably 2 to 3. In certain embodiments of the first-third embodiments, R'" is selected from a group having 1 to 6 carbon atoms (e.g., 1, 2, 3, 4, 5, or 6 carbon atoms), preferably 2 to 4 carbon atoms (e.g., 2, 3, or 4 carbon atoms). In certain embodiments of the first-third embodiments, R" is selected from an alkyl group having 1 to 6 carbon atoms (e.g., 1, 2, 3, 4, 5, or 6 carbon atoms), preferably 1 to 3 carbon atoms (e.g., 1, 2, or 3 carbon atoms), most preferably 1 carbon atom (e.g., methyl). In certain embodiments of the first-third embodiments, n is 3 resulting in a compound with a trihydrocarboxysilane moiety such as a trialkoxysilane moiety. Non-limiting examples of compounds having an imino group and meeting formula (I) above, which are suitable for providing the silica-reactive functional group for the styrene-butadiene rubber of (ii), include, but are not limited to, N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, and N-(4-N,N-dimethylaminobenzylidene)-3-(triethoxysilyl)-1-propaneamine.

Non-limiting examples of silicon-containing functional groups that can be utilized in certain embodiments of the first-third embodiments as a silica-reactive functional group in the styrene-butadiene rubber of (ii) include, but are not limited to, an organic silyl or siloxy group, and more precisely, the such functional group may be selected from an alkoxysilyl group, an alkylhalosilyl group, a siloxy group, an alkylaminosilyl group, and an alkoxyhalosilyl group. Optionally, the organic silyl or siloxy group may also contain one or more nitrogens. Suitable silicon-containing functional groups for use in functionalizing diene-based elastomer also include those disclosed in U.S. Pat. No. 6,369,167, the entire disclosure of which is herein incorporated by reference. In certain embodiments of the first-third embodiments, the styrene-butadiene rubber of (ii) comprises at least one silica-reactive functional group selected from the foregoing list of silicon-containing functional groups.

In certain preferred embodiments of the first-third embodiments, the styrene-butadiene rubber of (ii) includes a silica-reactive functional group which includes a silicon-containing functional group having a siloxy group (e.g., a hydrocarbyloxysilane-containing compound), wherein the compound optionally includes a monovalent group having at least one functional group. Such a silicon-containing functional group may be added by reacting the active terminal of a polymer chain with a compound having the following formula (II):

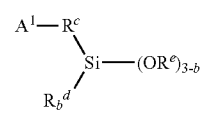

wherein $A^1$ represents a monovalent group having at least one functional group selected from epoxy, isocyanate, imine, cyano, carboxylic ester, carboxylic anhydride, cyclic tertiary amine, non-cyclic tertiary amine, pyridine, silazane and sulfide; $R^c$ represents a single bond or a divalent hydrocarbon group having from 1 to 20 carbon atoms (e.g., 1, 2, 3, 4, 5, 6, 7, 8, 9, 10, 11, 12, 13, 14, 15, 16, 17, 18, 19, or 20 carbon atoms); $R^d$ represents a monovalent aliphatic hydrocarbon group having 1 to 20 carbon atoms (e.g., 1, 2, 3, 4, 5, 6, 7, 8, 9, 10, 11, 12, 13, 14, 15, 16, 17, 18, 19, or 20 carbon atoms), a monovalent aromatic hydrocarbon group having 6 to 18 carbon atoms (e.g., 6, 7, 8, 9, 10, 11, 12, 13, 14, 15, 16, 17, or 18 carbon atoms) or a reactive group; $R^e$ represents a monovalent aliphatic hydrocarbon group having 1 to 20 carbon atoms (e.g., 1, 2, 3, 4, 5, 6, 7, 8, 9, 10, 11, 12, 13, 14, 15, 16, 17, 18, 19, or 20 carbon atoms) or a monovalent aromatic hydrocarbon group having 6 to 18 carbon atoms (e.g., 6, 7, 8, 9, 10, 11, 12, 13, 14, 15, 16, 17, or 18 carbon atoms); b is an integer of 0 to 2; when more than one $R^d$ or $OR^e$ are present, each $R^d$ and/or $OR^e$ may be the same as or different from each other; and an active proton is not contained in a molecule) and/or a partial condensation product thereof. As used herein, a partial condensation product refers to a product in which a part (not all) of a SiOR group in the hydrocarbyloxysilane compound is turned into a SiOSi bond by condensation. In certain embodiments of the first-third embodiments, at least one of the following is met: (a) $R^c$ represents a divalent hydrocarbon group having 1 to 12 carbon atoms (e.g., 1, 2, 3, 4, 5, 6, 7, 8, 9, 10, 11, or 12 carbon atoms), 2 to 6 carbon atoms (e.g., 2, 3, 4, 5, or 6 carbon atoms), or 2 to 3 carbon atoms (e.g., 2 or 3 carbon atoms); (b) $R^e$ represents a monovalent aliphatic hydrocarbon group having 1 to 12 carbon atoms (e.g., 1, 2, 3, 4, 5, 6, 7, 8, 9, 10, 11, or 12 carbon atoms), 2 to 6 carbon atoms (e.g., 2, 3, 4, 5, or 6 carbon atoms), or 1 to 2 carbon atoms or a monovalent aromatic hydrocarbon group having 6 to 8 carbon atoms; (c) $R^d$ represents a monovalent aliphatic hydrocarbon group having 1 to 12 carbon atoms (e.g., 1, 2, 3, 4, 5, 6, 7, 8, 9, 10, 11, or 12 carbon atoms), 2 to 6 carbon atoms (e.g., 2, 3, 4, 5, or 6 carbon atoms), or 1 to 2 carbon atoms or a monovalent aromatic hydrocarbon group having 6 to 8 carbon atoms; in certain such embodiments, each of (a), (b) and (c) are met and $R^c$, $R^e$ and $R^d$ are selected from one of the foregoing groups.

In certain embodiments of the first-third embodiments, the functional group of the styrene butadiene rubber of (ii) results from a compound represented by Formula (II) wherein $A^1$ has at least one epoxy group. Non-limiting specific examples of such compounds include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)-methyldimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane and the like. Among them, 3-glycidoxypropyltrimethoxysilane and 2-(3,4-epoxycyclohexyl)ethyltrimethoxysilane are particularly suited.

In certain embodiments of the first-third embodiments, the functional group of the styrene butadiene rubber of (ii) results from a compound represented by Formula (II) wherein $A^1$ has at least one isocyanate group. Non-limiting specific examples of such compounds include 3-isocyanatopropyltrimethoxysilane, 3-isocyanatopropyltriethoxysilane, 3-isocyanatopropylmethyldiethoxysilane, 3-isocyanatopropyltriisopropoxysilane and the like, and among them, 3-isocyanatopropyltrimethoxysilane is particularly preferred.

In certain embodiments of the first-third embodiments, the functional group of the styrene butadiene rubber of (ii) results from a compound represented by Formula (II) wherein $A^1$ has at least one imine group. Non-limiting specific examples of such compounds include N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine and trimethoxysilyl compounds, methyldiethoxysilyl compounds, ethyldimethoxysilyl compounds and the like each corresponding to the above triethoxysilyl compounds. Among them, N-(1,3-dimethylbutylidene)-3-(triethoxysilyl)-1-propaneamine and N-(1-methylpropylidene)-3-(triethoxysilyl)-1-propaneamine are particularly suited. Also, the imine(amidine) group-containing compounds include preferably 1-[3-trimethoxysilyl]propyl]-4,5-dihydroimidazole, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole and the like, and among them, N-(3-triethoxysilylpropyl)-4,5-dihydroimidazole and N-(3-isopropoxysilylpropyl)-4,5-dihydroimidazole are preferred.

In certain embodiments of the first-third embodiments, the functional group of the styrene butadiene rubber of (ii) results from a compound represented by Formula (II) wherein $A^1$ has at least one carboxylic ester group. Non-limiting specific examples of such compounds include 3-methacryloyloxypropyltriethoxysilane, 3-methacryloyloxypropyltrimethoxysilane, 3-methacryloyloxypropylmethyldiethoxysilane, 3-methacryloyloxypropyltriisopropoxysilane and the like, and among them, 3-methacryloyloxypropyltriethoxysilane is preferred.

In certain embodiments of the first-third embodiments, the functional group of the styrene butadiene rubber of (ii) results from a compound represented by Formula (II) wherein $A^1$ has at least one carboxylic anhydride group. Non-limiting specific examples of such compounds include 3-trimethoxysilylpropylsuccinic anhydride, 3-triethoxysilylpropylsuccinic anhydride, 3-methyldiethoxysilylpropylsuccinic anhydride and the like, and among them, 3-triethoxysilylpropylsuccinic anhydride is preferred.

In certain embodiments of the first-third embodiments, the functional group of the styrene butadiene rubber of (ii) results from a compound represented by Formula (II) wherein $A^1$ has at least one cyano group. Non-limiting specific examples of such compounds include 2-cyanoethylpropyltriethoxysilane and the like.

In certain embodiments of the first-third embodiments, the functional group of the styrene butadiene rubber of (ii) results from a compound represented by Formula (II) wherein $A^1$ has at least one cyclic tertiary amine group. Non-limiting specific examples of such compounds include 3-(1-hexamethyleneimino)propyltriethoxysilane, 3-(1-hexamethyleneimino)propyltrimethoxysilane, (1-hexamethyleneimino)methyltriethoxysilane, (1-hexamethyleneimino)methyltrimethoxysilane, 2-(1-hexamethyleneimino)ethyltriethoxysilane, 3-(1-hexamethyleneimino)ethyltrimethoxysilane, 3-(1-pyrrolidinyl)propyltrimethoxysilane, 3-(1-pyrrolidinyl)propyltriethoxysilane, 3-(1-heptamethyleneimino)propyltriethoxysilane, 3-(1-dodecamethyleneimino)propyltriethoxysilane, 3-(1-hexamethyleneimino)propyldiethoxymethylsilane, 3-(1-hexamethyleneimino)propyldiethoxyethylsilane, 3-[10-(triethoxysilyl)decyl]-4-oxazoline and the like. Among them, 3-(1- hexamethyleneimino)propyltriethoxysilane and (1-hexamethyleneimino)methyltriethoxysilane can preferably be listed.

In certain embodiments of the first-third embodiments, the functional group of the styrene butadiene rubber of (ii) results from a compound represented by Formula (II) wherein $A^1$ has at least one non-cyclic tertiary amine group. Non-limiting specific examples of such compounds include 3-dimethylaminopropyltriethoxysilane, 3-dimethylaminopropyltrimethoxysilane, 3-diethylaminopropyltriethoxysilane, 3-dimethylaminopropyltrimethoxysilane, 2-dimethylaminoethyltriethoxysilane, 2-dimethylaminoethyltrimethoxysilane, 3-dimethylaminopropyldiethoxymethylsilane, 3-dibutylaminopropyltriethoxysilane and the like, and among them, 3-dimethylaminopropyltriethoxysilane and 3-diethylaminopropyltriethoxysilane are suited.

In certain embodiments of the first-third embodiments, the functional group of the styrene butadiene rubber of (ii) results from a compound represented by Formula (II) wherein $A^1$ has at least one pyridine group. Non-limiting specific examples of such compounds include 2-trimethoxysilylethylpyridine and the like.

In certain preferred embodiments of the first-third embodiments, the functional group of the styrene butadiene rubber of (ii) results from a compound represented by Formula (II) wherein $A^1$ has at least one silazane group. Non-limiting specific examples of such compounds include N,N-bis(trimethylsilyl)-aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane and the like. N,N-bis(trimethylsilyl)aminopropyltriethoxysilane, N,N-bis(trimethylsilyl)aminopropylmethyldiethoxysilane or 1-trimethylsilyl-2,2-dimethoxy-1-aza-2-silacyclopentane are particularly preferred.

In those embodiments of the first-third embodiments wherein a silica-reactive functional group according to formula (II) is used wherein $A^1$ contains one or more protected nitrogens (as discussed in detail above), may be deprotected or deblocked by hydrolysis or other procedures to convert the protected nitrogen(s) into a primary nitrogen. As a non-limiting example, a nitrogen bonded to two trimethylsilyl groups could be deprotected and converted to a primary amine nitrogen (such a nitrogen would still be bonded to the remainder of the formula (II) compound). Accordingly, in certain embodiments of the first-third embodiments wherein a silica-reactive functional group of the styrene-butadiene rubber of (ii) results from use of a compound according to formula (II) wherein $A^1$ contains one or more protected nitrogens, the functionalized polymer can be understood as containing a functional group resulting from a deprotected (or hydrolyzed) version of the compound.

Non-limiting examples of oxygen- or sulfur-containing functional groups that can be utilized in certain embodiments of the first-third embodiments as a silica-reactive functional group in the styrene-butadiene rubber of (ii) include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group, and a thioketone group. In certain embodiments of the first-third embodiments, the foregoing alkoxy group may be an alcohol-derived alkoxy group derived from a benzophenone. In certain embodiments of the first-third embodiments, the styrene-butadiene rubber of (ii) comprises at least silica-reactive functional group selected from the foregoing list of oxygen- or sulfur-containing functional groups.

According to the first-third embodiments, the one or more styrene-butadiene rubbers of (ii) may be prepared by either solution polymerization or by emulsion polymerization. In certain preferred embodiments of the first-third embodiments, the only styrene-butadiene rubber(s) used in (ii) are prepared by solution polymerization. In other embodiments of the first-third embodiments, the only styrene-butadiene rubbers used in (ii) are prepared by emulsion polymerization. In certain embodiments of the first-third embodiments, when more than one styrene-butadiene rubber is used for (ii) the rubbers are a combination of solution polymerized SBR and emulsion polymerized SBR (e.g., one solution SBR and one emulsion SBR).

In certain embodiments of the first-third embodiments, a functionalized and coupled form of the styrene-butadiene rubber of (ii) can be utilized. Such an effect can be achieved by treating the living polymer with both coupling and functionalizing agents, which serve to couple some chains and functionalize other chains. The combination of coupling agent and functionalizing agent can be used at various molar ratios. Alternatively, in certain embodiments of the first-third embodiments, the styrene-butadiene rubber of (ii) may be silica-reactive merely from the result of coupling. Although the terms coupling and functionalizing agents have been employed in this specification, those skilled in the art appreciate that certain compounds may serve both functions. That is, certain compounds may both couple and provide the polymer chains with a functional group. Those skilled in the art also appreciate that the ability to couple polymer chains may depend upon the amount of coupling agent reacted with the polymer chains. For example, advantageous coupling may be achieved where the coupling agent is added in a one to one ratio between the equivalents of lithium on the initiator and equivalents of leaving groups (e.g., halogen atoms) on the coupling agent. Non-limiting examples of coupling agents include metal halides, metalloid halides, alkoxysilanes, alkoxystannanes, and combinations thereof.

In one or more embodiments of the first-third embodiments, the coupling agent for the styrene-butadiene rubber of (ii) comprises a metal halide or metalloid halide selected from the group comprising compounds expressed by the formula (1) $R^*_n M^1 Y_{(4-n)}$, the formula (2) $M^1 Y_4$, and the formula (3) $M^2 Y_3$, where each $R^*$ is independently a monovalent organic group having 1 to 20 carbon atoms, $M^1$ is a tin atom, silicon atom, or germanium atom, $M^2$ is a phosphorous atom, Y is a halogen atom, and n is an integer of 0-3.

Exemplary compounds expressed by the formula (1) include halogenated organic metal compounds, and the compounds expressed by the formulas (2) and (3) include halogenated metal compounds.

In the case where $M^1$ represents a tin atom, the compounds expressed by the formula (1) can be, for example, triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by formula (2).

In the case where $M^1$ represents a silicon atom, the compounds expressed by the formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the formula (2). In the case where $M^1$ represents a germanium atom, the compounds expressed by the formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the formula (2). Phosphorous trichloride, phosphorous tribromide and the like can be exemplified as the compounds expressed by the formula (3). In one or more embodiments, mixtures of metal halides and/or metalloid halides can be used.

In one or more embodiments of the first-third embodiments, the coupling agent for the styrene-butadiene rubber of (ii) comprises an alkoxysilane or alkoxystannane selected from the group comprising compounds expressed by the formula (4) $R^*_n M^1(OR^\wedge)_{4-n}$, where each $R^*$ is independently a monovalent organic group having 1 to 20 carbon atoms, $M^1$ is a tin atom, silicon atom, or germanium atom, $OR^\wedge$ is an alkoxy group where $R^\wedge$ is a monovalent organic group, and n is an integer of 0-3.

Exemplary compounds expressed by the formula (4) include tetraethyl orthosilicate, tetramethyl orthosilicate, tetrapropyl orthosilicate, tetraethoxy tin, tetramethoxy tin, and tetrapropoxy tin.

According to the first-third embodiments disclosed herein, the Mw, Mn and polydispersity (Mw/Mn) of the one or more styrene-butadiene rubbers of (ii) may vary. In certain embodiments of the first-third embodiments, the at least one styrene-butadiene rubber of (ii) has a Mw of 250,000 to 600,000 (e.g., 250,000; 275,000; 300,000; 325,000; 350,000; 375,000; 400,000; 425,000; 450,000; 475,000; 500,000; 525,000; 550,000; 575,000; or 600,000 grams/mole); 300,000 to 600,000; 350,000 to 550,000, or 400,000 to 500,000 grams/mole; in certain such embodiments, the styrene-butadiene rubber of (ii) consists of one rubber having a Mw within one of the foregoing ranges. In certain such embodiments, the styrene-butadiene rubber of (ii) consists of one rubber having a Mw within one of the foregoing ranges and a Tg of less than −40° C. (as described infra). The Mw values referred to herein are weight average molecular weights which can be determined by using gel permeation chromatography (GPC) calibrated with styrene-butadiene standards and Mark-Houwink constants for the polymer in question. In certain embodiments of the first-third embodiments, the styrene-butadiene rubber(s) of (ii) have a Mn of 200,000 to 400,000 grams/mole (e.g., 200,000; 225,000; 250,000; 275,000; 300,000; 325,000; 350,000; 375,000; or 400,000 grams/mole). In certain embodiments of the first-third embodiments, the styrene-butadiene rubber (s) of (ii) have a Mn of 200,000 to 350,000, or 200,000 to 300,000 grams/mole. The Mn values referred to herein are number average molecular weights which can be determined by using gel permeation chromatography (GPC) calibrated with styrene-butadiene standards and Mark-Houwink constants for the polymer in question. In certain embodiments of the first-third embodiments, the SBR of (ii) can have a Mn within one of the foregoing ranges in combination with a Mw within one of the foregoing ranges, optionally in combination with a Mw/Mn value as discussed below. In certain embodiments of the first-third embodiments disclosed herein, the styrene-butadiene rubber(s) of (ii) has (have) a Mw/Mn (polydispersity) of 1.2 to 2.5 to (e.g., 1.2, 1.3, 1.4, 1.5, 1.6, 1.7, 1.8, 1.9, 2, 2.1, 2.2, 2.3, 2.4, or 2.5), preferably 1.3 to 2, or 1.3 to 1.6.

Polybutadiene Rubber (i)

According to the first-third embodiments, (i) of the elastomer component consists of polybutadiene rubber having a cis bond content of at least 95% (e.g., 95%, 96%, 97%, 98%, 99%, or more) and a Tg of less than −101° C. (e.g., −102, −103, −104, −105, −106, −107, −108, −109° C. or less). In certain such embodiments, the Tg of the polybutadiene rubber (i) is −101 to −110° C. The cis bond content refers to the cis 1,4-bond content. The cis 1,4-bond contents referred to herein are determined by FTIR (Fourier Transform Infrared Spectroscopy) wherein a polymer sample is dissolved in $CS_2$ and then subjected to FTIR. In certain embodiments of the first-third embodiments, the polybutadiene rubber of (i) may have a cis 1,4-bond content of at least 98% (e.g., 98%, 99%, or more) or at least 99% (e.g., 99%, 99.5%, or more). In certain embodiments of the first-third embodiments, any polybutadiene rubber used in the tread rubber compositions has a Tg of −105° C. or less (e.g., −105, −106, −107, −108, −109° C. or less) such as −105 to −110° C. or −105 to −108° C. In certain embodiments of the first-third embodiments, any polybutadiene rubber used in the tread rubber compositions contains less than 3% by weight (e.g., 3%, 2%, 1%, 0.5%, or less), preferably less than 1% by weight (e.g., 1%, 0.5%, or less) or 0% by weight syndiotactic 1,2-polybutadiene. Generally, according to the first-third embodiments, one or more than one polybutadiene rubber having a cis bond content of at least 95% and a Tg of less than −101° C. may be used for (i). In certain embodiments of the first-third embodiments, (i) consists of only one polybutadiene rubber having a cis bond content of at least 95% (e.g., 95%, 96%, 97%, 98%, 99%, or more) and a Tg of less than −101° C. In preferred embodiments of the first-third embodiments, the amount of any polybutadiene rubber having a high vinyl content (i.e., above about 70%) is limited (in the overall tread rubber composition) to less than 25 parts, more preferably less than 10 parts, even more preferably less than 5 parts or 0 parts.

The use of the claimed amounts of polybutadiene having a cis bond content of at least 95% and a Tg of less than −101° C. in the tire tread rubber compositions according to the first-third embodiments (preferably in combination with the other components of the tire tread rubber compositions according to the first-third embodiments) disclosed herein can result in an improvement in dry handling performance along with maintaining wet performance and wear as compared to a control rubber composition which uses less than the claimed amount of polybutadiene (e.g., 50 parts) and replaces the missing amount of polybutadiene with an equivalent amount of styrene-butadiene rubber (ii). By stating that the wear performance is maintained is meant that the wear performance (as measured by ISO 23337:2016)) is at least 90% of a control (e.g., 90%, 91%, 92%, 93%, 94%, 95%, 96%, 97%, 98%, 99%, 100%, or more, including ranges within the foregoing such as 90-92%, 90-95%, 90-97%, 90-100%, 92-95%, 92-97%, 92-100%, etc.) as compared to a control rubber composition as described above. As discussed further, infra, wear can be measured by DIN abrasion values (using standard method DIN ISO 4649, 2014 edition) wherein a lower value (i.e., less material lost) indicates better wear. As non-limiting examples, if a sample exhibited an abrasion loss of 0.0055 mg and its control exhibited an abrasion loss of 0.0050, the sample could be described as having a wear performance that is 95% of its control and if a sample exhibited an abrasion loss of 0.0054 mg and its control exhibited an abrasion loss of 0.0060 mg, the sample could be described as having a wear performance that is improved by 10% as compared to its control. According to the foregoing descriptions, a wear performance that is 100% of its control should be understood as having a wear performance that is equal to its control. In certain embodiments of the first-third embodiments, the tire tread rubber composition exhibits an improvement in dry handling performance (as evidenced by its value tan δ at 30° C., as discussed in more detail, infra) of at least 5% (e.g., 5%, 6%, 7%, 8%, 9%, 10%, 11%, 12%, 13%, 5-13%, 5-10%, etc.), or even at least 10% (e.g., 10%, 11%, 12%, 13%, 10-13%, etc.) as compared to a control rubber composition as described above. Alternatively, the foregoing improvements can also be described as being at least 105% (with 105% being 5% higher than 100%) and at least 110% (with 110% being 10% higher than 100%) as compared to a control. Notably, for dry handling performance, a higher value of tan δ at 0° C. indicates better dry handling performance. According to the foregoing descriptions, a dry handling performance that is 100% of its control should be understood as having a dry performance that is equal to its control and the comparisons to control are calculated by dividing the control value by the sample value and multiplying by 100%.

Natural Rubber, Polyisoprene, or a Combination Thereof of (iii)

As mentioned above, according to the first and second embodiments 10-20 parts (e.g., 10, 12, 14, 15, 16, 18, or 20 parts) and according to the third embodiment about 15 to about 25 parts or 15-25 parts (e.g., 15, 17, 19, 20, 21, 23, or 25 parts) of natural rubber, polyisoprene, or a combination thereof are present as (iii) in the tread rubber composition. In certain embodiments of the first-third embodiments, (iii) consists (only) of natural rubber. In other embodiments of the first-third embodiments, (iii) consists (only) of polyisoprene. When natural rubber is present, it may include Hevea natural rubber, non-Hevea natural rubber (e.g., guayule natural rubber), or a combination thereof. When natural rubber is utilized in the tread rubber compositions of the first-third embodiments, the natural rubber preferably has a Mw of 1,000,000 to 2,000,000 grams/mole (e.g., 1 million, 1.1 million, 1.2 million, 1.3 million, 1.4 million, 1.5 million, 1.6 million, 1.7 million, 1.8 million, 1.9 million, 2 million grams/mole); 1,250,000 to 2,000,000 grams/mole, or 1,500,000 to 2,000,000 grams/mole (as measured by GPC using a polystyrene standard). When natural rubber is utilized in the tread rubber compositions of the first-third embodiments, the Tg of the natural rubber may vary. Preferably, according to the first-third embodiments, when natural rubber is utilized it has a Tg of −65 to −80° C. (e.g., −65, −66, −67, −68, −69, −70, −71, −72, −73, −74, −75, −76, −77, −78, −79, or −80° C.), more preferably a Tg of −67 to −77° C. (e.g., −67, −68, −69, −70, −71, −72, −73, −74, −75, −76, or −77° C.). When polyisoprene is utilized in the tread rubber compositions of the first-third embodiments, the Tg of the polyisoprene may vary. Preferably, according to the first-third embodiments, when polyisoprene is utilized it has a Tg of −55 to −75° C. (e.g., −55, −56, −57, −58, −59, −60, −61, −62, −63, −64, −65, −66, −67, −68, −69, −70, −71, −72, −73, −74, or −75° C.), more preferably −58 to −74° C. (e.g., −58, −59, −60, −61, −62, −63, −64, −65, −66, −67, −68, −69, −70, −71, −72, −73, or −74° C.).

Fillers

As used herein, the term "reinforcing" with respect to "reinforcing carbon black filler," "reinforcing silica filler," and "reinforcing filler" generally should be understood to encompass both fillers that are traditionally described as reinforcing as well as fillers that may traditionally be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively (or additionally), the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler (as discussed below) and a reinforcing filler. In certain embodiments of the first-third embodiments disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, or more than 100 $m^2/g$. In certain embodiments of the first-third embodiments disclosed herein, the term "reinforcing filler" is used to refer to a particulate material that has a particle size of about 10 nm up to about 1000 nm, including 10 nm to 1000 nm, about 10 nm up to about 50 nm and 10 nm to 50 nm.

Reinforcing Silica Filler

As mentioned above, according to the first and third embodiments disclosed herein, the tread rubber compositions comprise (include) at least one reinforcing silica filler in an amount of 101-150 phr (e.g., 101, 105, 110, 115, 120, 125, 130, 135, 140, 145 or 150 phr), preferably having a surface area of about 150 to about 300 $m^2/g$ or 150-300 $m^2/g$, more preferably about 180 to about 250 $m^2/g$, and according to the second embodiment comprises (includes) at least one reinforcing silica filler in an amount of about 110 to about 130 phr or 110-130 phr (e.g., 110, 112, 114, 115, 116, 118, 120, 122, 124, 125, 126, 128 or 130 phr), preferably having a surface area of about 150 to about 300 $m^2/g$ or 150-300 $m^2/g$, more preferably about 180 to about 250 $m^2/g$.

In certain preferred embodiments of the first-third embodiments, the tread rubber composition comprises (includes) at least one reinforcing silica filler having a surface area of 150 to 300 $m^2/g$ (e.g., 150, 160, 180, 200, 220, 240, 260, 280, or 300 $m^2/g$). In certain preferred embodiments of the first-third embodiments the tread rubber composition comprises (includes) at least one reinforcing silica filler having a surface area of 180 to 250 $m^2/g$ (e.g., 180, 185, 190, 195, 200, 205, 210, 215, 220, 225, 230, 235, 240, or 250 $m^2/g$) which should be understood as including intermediary ranges such as 180-240, 180-230, 180-220, 180-210, 190-240, 190-230, 190-220, 190-210, etc. According to the first-third embodiments, one or more than one reinforcing silica filler having a surface area as discussed above may be utilized; in those embodiments where more than one such reinforcing silica filler is utilized, the foregoing amounts refer to the total amount of all reinforcing silica fillers. In certain embodiments of the first-third embodiments, only one reinforcing silica filler having a surface area as discussed above is utilized. In preferred embodiments of the first-third embodiments, the only reinforcing silica filler(s) used in the tread rubber composition have a surface area of as discussed above; in such embodiments, the tread rubber composition can be understood as being free of (i.e., contains 0 phr of) reinforcing silica filler having a surface area outside the above-discussed ranges.

According to the first-third embodiments, the particular type of silica used for the at least one reinforcing silica filler having a surface area as discussed above may vary. Non-limiting examples of reinforcing silica fillers suitable for use in certain embodiments of the first-third embodiments include, but are not limited to, precipitated amorphous silica, wet silica (hydrated silicic acid), dry silica (anhydrous silicic acid), fumed silica, calcium silicate and the like. Other suitable reinforcing silica fillers for use in certain embodiments of the first-third embodiments include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4 \cdot 3SiO_4 \cdot 5H_2O$ etc.), aluminum calcium silicate ($Al_2O_3 \cdot CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the first-third embodiments disclosed herein, the rubber composition comprises a reinforcing silica filler having a surface area (as measured by the BET method), as discussed infra. In certain embodiments of the first-third embodiments disclosed herein, the rubber composition comprises reinforcing silica filler having a pH of about 5.5 to about 8, 5.5 to 8 (e.g., 5.5, 5.7, 5.9, 6.1, 6.3, 6.5, 6.7, 6.9, 7.1, 7.3, 7.5, 7.7, 7.9, or 8), about 6 to about 8, 6 to 8 (e.g., 6, 6.2, 6.4, 6.6, 6.8, 7, 7.2, 7.4, 7.6, 7.8, or 8), about 6 to about 7.5, 6 to 7.5, about 6.5 to about 8, 6.5 to 8, about 6.5 to about 7.5, 6.5 to 7.5, about 5.5 to about 6.8, or 5.5 to 6.8. Some of the commercially available reinforcing silica fillers which can be used in certain embodiments of the first-third embodiments include, but are not limited to, Hi-Sil® EZ120G, Hi-Sil® EZ120G-D, Hi-Sil® 134G, Hi-Sil® EZ 160G, Hi-Sil® EZ 160G-D, Hi-Sil® 190, Hi-Sil® 190G-D, Hi-Sil® EZ 200G, Hi-Sil® EZ 200G-D, Hi-Sil® 210, Hi-Sil® 233, Hi-Sil® 243LD, Hi-Sil® 255CG-D, Hi-Sil® 315-D, Hi-Sil® 315G-D, Hi-Sil® HDP 320G and the like, produced by PPG Industries (Pittsburgh, Pa.) As well, a number of useful commercial grades of different reinforcing silica fillers are also available from Evonik Corporation (e.g., Ultrasil® 320 GR, Ultrasil® 5000 GR, Ultrasil® 5500 GR, Ultrasil® 7000 GR, Ultrasil® VN2 GR, Ultrasil® VN2, Ultrasil® VN3, Ultrasil® VN3 GR, Ultrasil® 7000 GR, Ultrasil® 7005, Ultrasil® 7500 GR, Ultrasil® 7800 GR, Ultrasil® 9500 GR, Ultrasil® 9000 G, Ultrasil® 9100 GR), and Solvay (e.g., Zeosil® 1115MP, Zeosil® 1085GR, Zeosil® 1165MP, Zeosil® 1200MP, Zeosil® Premium, Zeosil® 195HR, Zeosil® 195GR, Zeosil® 185GR, Zeosil® 175GR, and Zeosil® 165 GR).

Silica Coupling Agent

In certain embodiments of the first-third embodiments disclosed herein, one or more than one silica coupling agent may also (optionally) be utilized. In preferred embodiments of the first-third embodiments, at least one silica coupling agent is utilized. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processability and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the first-third embodiments disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^{10}_p Si(OR^{11})_{4-p}$ where each $R^{11}$ is independently a monovalent organic group, and p is an integer from 1 to 3, with the proviso that at least one $R^{10}$ is an alkyl group. Preferably p is 1. Generally, each $R^{10}$ independently comprises $C_1$ to $C_{20}$ aliphatic, $C_5$ to $C_{20}$ cycloaliphatic, or $C_6$ to $C_{20}$ aromatic; and each $R^{11}$ independently comprises $C_1$ to $C_6$ aliphatic. In certain exemplary embodiments, each $R^{10}$ independently comprises $C_6$ to $C_{15}$ aliphatic and in additional embodiments each $R^{10}$ independently comprises $C_8$ to $C_{14}$ aliphatic. Mercapto silanes have the general formula $HS-R^{13}-Si(R^{14})(R^{15})_2$ where $R^{13}$ is a divalent organic group, $R^{14}$ is a halogen atom or an alkoxy group, each $R^{15}$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B-S-R^{16}-Si-X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^{16}$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain embodiments of the first-third embodiments include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the first-third embodiments include bis(trialkoxysilylorgano) disulfides and bis(trialkoxysilylorgano)tetrasulfides. Specific non-limiting examples of bis(trialkoxysilylorgano)disulfides include, but are not limited to, 3,3'-bis(triethoxysilylpropyl) disulfide, 3,3'-bis(trimethoxysilylpropyl) disulfide, 3,3'-bis(tributoxysilylpropyl)disulfide, 3,3'-bis(tri-t-butoxysilylpropyl)disulfide, 3,3'-bis(trihexoxysilylpropyl) disulfide, 2,2'-bis(dimethylmethoxysilylethyl)disulfide, 3,3'-bis(diphenylcyclohexoxysilylpropyl)disulfide, 3,3'-bis (ethyl-di-sec-butoxysilylpropyl)disulfide, 3,3'-bis (propyldiethoxysilylpropyl)disulfide, 12,12'-bis (triisopropoxysilyl propyl)disulfide, 3,3'-bis (dimethoxyphenylsilyl-2-methylpropyl)disulfide, and mixtures thereof. Non-limiting examples of bis(trialkoxysilylorgano)tetrasulfide silica coupling agents suitable for use in certain embodiments of the first-third embodiments include, but are not limited to, bis(3-triethoxysilylpropyl) tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of first-third embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiments of the first-third embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, NY.

Non-limiting examples of pre-treated silicas (i.e., silicas that have been pre-surface treated with a silane) suitable for use in certain embodiments of the first-third embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane bis(triethoxysilylpropyl) polysulfide (Si69) and Ultrasil® VN3 silica. Coupsil 6508, Agilon 400™ silica from PPG Industries, Agilon 454° silica from PPG Industries, and 458° silica from PPG Industries. In those embodiments where the silica comprises a pre-treated silica, the pre-treated silica is used in an amount as previously disclosed for the silica filler (i.e., 101-150 phr, or about 110 to about 130 phr, etc.).

When a silica coupling agent is utilized in an embodiment of the first-third embodiments, the amount used may vary. In certain embodiments of the first-third embodiments, the rubber compositions do not contain any silica coupling agent. In other preferred embodiments of the first-third embodiments, the silica coupling agent is present in an amount sufficient to provide a ratio of the total amount of silica coupling agent to silica filler of about 0.1:100 to about 1:5 (i.e., about 0.1 to about 20 parts by weight per 100 parts of silica), including 0.1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In preferred embodiments of the first-third embodiments, the ratio of the total amount of silica coupling agent to silica filler falls within a ratio of 1:10 to 1:20 (i.e., 10 to 5 parts by weight per 100 parts of silica). In certain embodiments according to the first-third embodiments, the rubber composition comprises about 0.1 to about 15 phr silica coupling agent, including 0.1 to 15 phr (e.g., 0.1, 0.5, 1, 2, 3, 4, 5, 6, 7, 8, 9, 10, 11, 12, 13, 14, or 15 phr), about 0.1 to about 12 phr, 0.1 to 12 phr, about 0.1 to about 10 phr, 0.1 to 10 phr, about 0.1 to about 7 phr, 0.1 to 7 phr, about 0.1 to about 5 phr, 0.1 to 5 phr, about 0.1 to about 3 phr, 0.1 to 3 phr, about 1 to about 15 phr, 1 to 15 phr (e.g., 1, 2, 3, 4, 5, 6, 7, 8, 9, 10, 11, 12, 13, 14, or 15 phr), about 1 to about 12 phr, 1 to 12 phr (e.g., 1, 2, 3, 4, 5, 6, 7, 8, 9, 10, 11, or 12 phr), about 1 to about 10 phr, 1 to 10 phr (e.g., 1, 1.5, 2, 2.5, 3, 3.5, 4, 4.5, 5, 5.5, 6, 6.5, 7, 7.5, 8, 8.5, 9, 9.5, or 10 phr), about 1 to about 7 phr, 1 to 7 phr, about 1 to about 5 phr, 1 to 5 phr, about 1 to about 3 phr, 1 to 3 phr, about 3 to about 15 phr, 3 to 15 phr, about 3 to about 12 phr, 3 to 12 phr, about 3 to about 10 phr, 3 to 10 phr, about 3 to about 7 phr, 3 to 7 phr, about 3 to about 5 phr, 3 to 5 phr, about 5 to about 15 phr, 5 to 15 phr, about 5 to about 12 phr, 5 to 12 phr, about 5 to about 10 phr, 5 to 10 phr, about 5 to about 7 phr, or 5 to 7 phr. In preferred embodiments of the first-third embodiments, the rubber composition comprises silica coupling agent in an amount of 5 to 12 phr or one of the foregoing ranges falling within this range.

Carbon Black Filler

According to the first-third embodiments disclosed herein, the amount of carbon black filler used in the tread rubber composition is limited. More specifically, according to the second embodiment disclosed herein, the tread rubber composition contains no more than 10 phr (e.g., 10, 9, 8, 7, 6, 5, 4, 3, 2, 1, or even 0 phr) and according to the first and third embodiments disclosed herein, the tread rubber composition contains no more than 20 phr (e.g., 20, 18, 16, 15, 14, 12, 10, 8, 6, 5, 4, 2, 1, or even 0 phr), preferably no more than 15 phr of carbon black (e.g., 15, 14, 13, 12, 11, 10, 9, 8, 7, 6, 5, 4, 3, 2, 1, or even 0 phr). In certain embodiments of the first and third embodiments, the tread rubber composition contains 1-10 phr, 1-9 phr, 1-8 phr, no more than 8 phr (e.g., 8, 7, 6, 5, 4, 3, 2, 1 or even 0 phr), 0-9 phr, or 0-8 phr of carbon black filler. In certain embodiments of the first-third embodiments, the tread rubber composition contains 0 phr of carbon black filler. In certain embodiments of the first-third embodiments, the foregoing limited amounts of carbon black filler should be understood to refer to reinforcing carbon black filler. In other embodiments of the first-third embodiments, the foregoing limited amounts of carbon black filler should be understood to refer to non-reinforcing carbon black filler. In yet other embodiments of the first-third embodiments, the foregoing limited amounts of carbon black filler should be understood to refer to all carbon black fillers (i.e., both reinforcing and non-reinforcing carbon black filler).

In those embodiments of the first-third embodiments where carbon black filler is present, the particular type or types of carbon black utilized may vary. Generally, suitable carbon blacks for use as a reinforcing filler in the rubber composition of certain embodiments of the first-third embodiments include any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used herein for carbon blacks are determined by ASTM D-1765 using the cetyltrimethylammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-third embodiments, the rubber composition includes a mixture of two or more of the foregoing blacks. Preferably according to the first-third embodiments, if a carbon black filler is present it consists of only one type (or grade) of reinforcing carbon black. Typical suitable carbon blacks for use in certain embodiments of the first-third embodiments are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Other Reinforcing Fillers

In certain embodiments of the first-third embodiments, the tread rubber composition comprises a reinforcing filler other than carbon black or silica (i.e., an additional reinforcing filler). While one or more than one additional reinforcing filler may be utilized, their total amount is preferably limited to no more than 10 phr (e.g., 10, 9, 8, 7, 6, 5, 4, 3, 2, 1 or 0 phr), or no more than 5 phr (e.g., 5, 4, 3, 2, 1, or 0 phr). In certain preferred embodiments of the first-third embodiments, the tread rubber composition contains no additional reinforcing filler (i.e., 0 phr); in other words, in such embodiments no reinforcing filler other than silica and optionally carbon black are present.

In those embodiments of the first-third embodiments wherein an additional reinforcing filler is utilized, the additional reinforcing filler or fillers may vary. Non-limiting examples of suitable additional reinforcing fillers for use in the tread rubber compositions of certain embodiments of the first-third embodiments include, but are not limited to, alumina, aluminum hydroxide, clay (reinforcing grades), magnesium hydroxide, boron nitride, aluminum nitride, titanium dioxide, reinforcing zinc oxide, and combinations thereof.

Non-Reinforcing Fillers

In certain embodiments of the first-third embodiments, the tread rubber composition further comprises at least one non-reinforcing filler. In other preferred embodiments of the first-third embodiments, the tread rubber composition contains no non-reinforcing fillers (i.e., 0 phr). In embodiments of the first-third embodiments wherein at least one non-reinforcing filler is utilized, the at least one non-reinforcing filler may be selected from clay (non-reinforcing grades), graphite, magnesium dioxide, aluminum oxide, starch, boron nitride (non-reinforcing grades), silicon nitride, aluminum nitride (non-reinforcing grades), calcium silicate, silicon carbide, ground rubber, and combinations thereof. The term "non-reinforcing filler" is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM D6556. In certain embodiments, the term "non-reinforcing filler" is alternatively or additionally used to refer to a particulate material that has a particle size of greater than about 1000 nm (including greater than 1000 nm). In those embodiments of the first-third embodiments, wherein a non-reinforcing filler is present in the rubber composition, the total amount of non-reinforcing filler may vary but is preferably no more than 10 phr (e.g., 10, 9, 8, 7, 6, 5, 4, 3, 2, or 1 phr), and in certain embodiments 1-10 phr, no more than 5 phr (e.g., 5, 4, 3, 2, or 1 phr), 1-5 phr, or no more than 1 phr.

Hydrocarbon Resins

As mentioned above, according to the first and third embodiments, the tread rubber composition comprises (includes) (d) 30-50 phr (e.g., 30, 31, 32, 33, 34, 35, 36, 37, 38, 39, 40, 41, 42, 43, 44, 45, 46, 47, 48, 49, or 50 phr) of at least one hydrocarbon resin having a Tg of about 30 to about 50° C. or 30-50° C. (e.g., 30, 31, 32, 33, 34, 35, 36, 37, 38, 39, 40, 41, 42, 43, 44, 45, 46, 47, 48, 49, or 50° C.). As also mentioned above, according to the second embodiment, the tread rubber composition comprises (includes) (d) about 35 to about 45 phr or 35-45 phr (e.g., 35, 36, 37, 38, 39, 40, 41, 42, 43, 44, or 45 phr) of at least one hydrocarbon resin having a Tg of about 30 to about 50° C., or 30-50° C. (e.g., 30, 31, 32, 33, 34, 35, 36, 37, 38, 39, 40, 42, 43, 44, 45, 46, 47, 48, 49, or 50° C.). Hydrocarbon resin Tg can be determined by DSC, according to the procedure discussed above for elastomer Tg measurements. In certain embodiments of the first-third embodiments, the at least one hydrocarbon resin of (d) has a Tg of about 35 to about 50° C., 35-50° C. (e.g., 30, 32, 34, 35, 36, 38, 40, 42, 44, 45, 46, 48, or 50° C.), about 35 to about 45° C., or 35-45° C. (e.g., 35, 36, 37, 38, 39, 40, 41, 42, 43, 44, 45, or 45° C.). In certain embodiments of the first and third embodiments, (d) is present in an amount of 30-45 phr (e.g., 30, 31, 32, 33, 34, 35, 36, 37, 38, 39, 40, 41, 42, 43, 44, or 45 phr), or 35-45 phr (e.g., 35, 36, 37, 38, 39, 40, 41, 42, 43, 44, or 45 phr). As discussed in more detail below, in certain embodiments of the first-third embodiments, the at least one hydrocarbon resin of (d) comprises an aromatic resin.

As discussed further infra according to the first-third embodiments in addition to controlling the amount of hydrocarbon resin (d) used in the tread rubber compositions, it is also preferable to control the total (or combined) amount of hydrocarbon resin (d) and liquid plasticizer (e) to within the amounts discussed elsewhere herein.

According to the first-third embodiments, one or more than one hydrocarbon resin may be utilized in the tread rubber composition and the particular type or types of hydrocarbon resin may vary. When more than one hydrocarbon resin is utilized, the above-discussed amounts should be understood to refer to the total amount of all hydrocarbon resins.

In certain embodiments of the first-third embodiments, the hydrocarbon resin of (d) comprises an aromatic resin optionally in combination with one or more additional resins selected from aliphatic, cycloaliphatic, and terpene resins; in those embodiments of the first-third embodiments wherein one or more additional resins are present, the total amount of such additional resin(s) is preferably no more than 5 phr, less than 5 phr, less than 4 phr, less than 3 phr, less than 2 phr, or less than 1 phr (and in each instance no more than 10% by weight, preferably no more than 5% by weight of the overall amount of hydrocarbon resin of (d)). In other embodiments of the first-third embodiments, the hydrocarbon resin of (d) consists of an aromatic resin. When an aromatic resin is used, one or more than one aromatic resin may be utilized. In certain embodiments of the first-third embodiments, the hydrocarbon resin excludes any terpene resin (i.e., 0 phr of terpene resin is present in the tread rubber composition). As used herein, the term aromatic resin should be understood to include both aromatic homopolymer resins and aromatic copolymer resins. An aromatic copolymer resins refers to a hydrocarbon resin which comprises a combination of one or more aromatic monomers in combination with one or more other (non-aromatic) monomers, with the largest amount of any type of monomer being aromatic. An aromatic copolymer resin would include a hydrocarbon resin having 45% by weight aromatic monomers, in addition to 25% by weight cycloaliphatic monomers and 30% by weight aliphatic monomers as well as a hydrocarbon resin having 55% by weight aromatic monomers, in addition to 30% by weight cycloaliphatic monomers and 15% by weight aliphatic monomers. In certain embodiments of the first-third embodiments, the hydrocarbon resin of (d) comprises one or more aromatic copolymer resins having a majority by weight of all monomers being aromatic (e.g., 51%, 55%, 60%, 65%, etc.). Non-limiting examples of aromatic resins suitable for use as the hydrocarbon resin (d) in certain embodiments of the first-third embodiments include coumarone-indene resins and alkylphenol resins as well as vinyl aromatic homopolymer or copolymer resins such as those including one or more of the following monomers: alpha-methylstyrene, styrene, ortho-methylstyrene, meta-methylstyrene, para-methylstyrene, vinyltoluene, para(tert-butyl)styrene, methoxystyrene, chlorostyrene, hydroxystyrene, vinylmesitylene, divinylbenzene, vinylnaphthalene or any vinyl aromatic monomer resulting from C9 fraction or C8-C10 fraction. Non-limiting examples of vinylaromatic copolymer resins include vinylaromatic/terpene copolymer resins (e.g., limonene/styrene copolymer resins), vinylaromatic/C5 fraction resins (e.g., C5 fraction/styrene copolymer resin), vinylaromatic/aliphatic copolymer resins (e.g., CPD/styrene copolymer resin, and DCPD/styrene copolymer resin). Non-limiting examples of alkyl-phenol resins include alkylphenol-acetylene resins such as p-tert-butylphenol-acetylene resins, alkylphenol-formaldehyde resins (such as those having a low degree of polymerization). Exemplary such aromatic resins are commercially available from various companies including Chemfax, Dow Chemical Company, Eastman Chemical Company, Idemitsu, Neville Chemical Company, Nippon, Polysat Inc., Resinall Corp., and Zeon under various trade names.

In certain embodiments of the first-third embodiments, the hydrocarbon resin (d) comprises an aromatic resin based upon one or more of the above-mentioned vinyl aromatic monomers (e.g., styrene, alpha-methylstyrene); in certain such embodiments at least 80% by weight, at least 85% by weight, at least 90% by weight, at least 95% by weight, at least 98% by weight, at least 99% by weight, or even 100% by weight of the monomers in the aromatic resin are aromatic monomers. In certain embodiments of the first-third embodiments, the hydrocarbon resin (d) consists of an aromatic resin based upon one or more of the above-mentioned vinyl aromatic monomers (e.g., styrene, alpha-methylstyrene); in certain such embodiments at least 80% by weight, at least 85% by weight, at least 90% by weight, at least 95% by weight, at least 98% by weight, at least 99% by weight, or even 100% by weight of the monomers in the aromatic resin are aromatic monomers. In certain embodiments of the first-third embodiments, the aromatic resin of (d) may include a hydrogenated form of one of the aromatic resins discussed above (i.e., a hydrogenated aromatic resin). In other embodiments of the first-third embodiments, the aromatic resin of (d) excludes any hydrogenated aromatic resin; in other words, in such embodiments, the aromatic resin is not hydrogenated.

As mentioned above, in certain embodiments of the first-third embodiments, the at least one hydrocarbon resin of (d) comprises (i) an aromatic resin in combination with (ii) an aliphatic resin. Non-limiting examples of aliphatic resins include C5 fraction homopolymer and copolymer resins. The amount of any aliphatic resin used in (d) is preferably limited. According to the first-third embodiments, the total amount of any aliphatic resin used in combination with the aromatic resin is preferably no more than 5 phr, less than 5 phr, less than 4 phr, less than 3 phr, less than 2 phr, or less than 1 phr (and in each instance no more than 20% by weight, preferably no more than 15% or no more than 10% by weight of the overall amount of hydrocarbon resin of (d)).

As mentioned above, in certain embodiments of the first-third embodiments, the at least one hydrocarbon resin of (d) comprises (i) an aromatic resin in combination with (ii) a cycloaliphatic resin. Non-limiting examples of cycloaliphatic resins include cyclopentadiene ("CPD") homopolymer or copolymer resins, dicyclopentadiene ("DCPD") homopolymer or copolymer resins, and combinations thereof. The amount of any cycloaliphatic resin used in (d) is preferably limited. According to the first-third embodiments, the total amount of any cycloaliphatic resin used in combination with the aromatic resin is preferably no more than 5 phr, less than 5 phr, less than 4 phr, less than 3 phr, less than 2 phr, or less than 1 phr (and in each instance no more than 20% by weight, preferably no more than 15% or no more than 10% by weight of the overall amount of hydrocarbon resin of (d)).

As mentioned above, in certain embodiments of the first-third embodiments the at least one hydrocarbon resin of (d) comprises (i) an aromatic resin in combination with (ii) a terpene resin. Non-limiting examples of terpene resins include alpha-pinene resins, beta-pinene resins, limonene resins (e.g., L-limonene, D-limonene, dipentene which is a racemic mixture of L- and D-isomers), beta-phellandrene, delta-3-carene, delta-2-carene, and combinations thereof. The amount of any terpene resin used in (d) is preferably limited. According to the first-third embodiments, the total amount of any terpene resin used in combination with the aromatic resin is preferably no more than 5 phr, less than 5 phr, less than 4 phr, less than 3 phr, less than 2 phr, or less than 1 phr (and in each instance no more than 20% by weight, preferably no more than 15% or no more than 10% by weight of the overall amount of hydrocarbon resin of (d)). As mentioned above, in preferred embodiments of the first-third embodiments, the hydrocarbon resin (d) includes no terpene resin (i.e., 0 phr).

In certain preferred embodiments of the first-third embodiments, the hydrocarbon resin (d) has a softening point of about 70 to about 100° C., 70-100° C. (e.g., 70, 75, 80, 85, 90, 95, or 100° C.), preferably about 75 to about 95° C. or 75-95° C. (e.g., 75, 80, 85, 90, or 95° C.). Generally the softening point of a hydrocarbon resin will have a relationship to its Tg such that the Tg is lower than its softening point, and such that the lower the Tg the lower the softening point. As a non-limiting example, for two hydrocarbon resins having Tg's of 70 and 100° C., the resin with the Tg of 70° C. will have a lower softening point than the resin with the Tg of 100° C.

In certain embodiments of the first-third embodiments, the hydrocarbon resin (d) meets at least one of the following: (a) a Mw of 1000 to about 4000 grams/mole, 1000-4000 grams/mole (e.g., 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 grams/mole), about 1000 to about 3000 grams/mole, 1000-3000 grams/mole (e.g., 1000, 1100, 1200, 1300, 1400, 1500, 1600, 1700, 1800, 1900, 2000, 2100, 2200, 2300, 2400, 2500, 2600, 2700, 2800, 2900, or 3000 grams/mole), about 1000 to about 2500 grams/mole, 1000-2500 grams/mole (e.g., 1000, 1100, 1200, 1300, 1400, 1500, 1600, 1700, 1800, 1900, 2000, 2100, 2200, 2300, 2400, or 2500 grams/mole), about 1000 to about 2000 grams/mole, 1000-2000 grams/mole (e.g., 1000, 1100, 1200, 1300, 1400, 1500, 1600, 1700, 1800, 1900, or 2000 grams/mole), about 1100 to about 1800 grams/mole, or 1100-1800 grams/mole (e.g., 1100, 1200, 1300, 1400, 1500, 1600, 1700, or 1800 grams/mole); (b) a Mn of about 700 to about 1500 grams/mole, 700-1500 grams/mole (e.g., 700, 800, 900, 1000, 1100, 1200, 1300, 1400, or 1500 grams/mole), about 800 to about 1400 grams/mole, 800-1400 grams/mole (e.g., 800, 900, 1000, 1100, 1200, 1300, or 1400 grams/mole), about 800 to about 1300 grams/mole, 800-1300 grams/mole (e.g., 800, 900, 1000, 1100, 1200, or 1300 grams/mole), about 900 to about 1200 grams/mole, or 900-1200 grams/mole (e.g., 900, 950, 1000, 1050, 1100, 1150, or 1200 grams/mole); or (c) a polydispersity (Mw/Mn) of about 1 to about 2, 1-2 (e.g., 1, 1.1, 1.2, 1.3, 1.4, 1.5, 1.6, 1.7, 1.8, 1.9, or 2), about 1.1 to about 1.8, 1.1-1.8 (e.g., 1.1, 1.2, 1.3, 1.4, 1.5, 1.6, 1.7, or 1.8), about 1.1 to about 1.7, 1.1-1.7 (e.g., 1.1, 1.2, 1.3, 1.4, 1.5, 1.6, or 1.7), about 1.2 to about 1.5, or 1.2 to 1.5 (e.g., 1.2, 1.3, 1.4, or 1.5). In certain preferred embodiments of the first-third embodiments, the hydrocarbon resin (d) has a Mw according to one of the ranges provided above, in combination with a Mn according to one of the ranges provided above, further in combination with a Mw/Mn according to one of the ranges provided above; in certain such embodiments, the hydrocarbon resin (d) is an aromatic resin.

In certain embodiments of the first-third embodiments, the hydrocarbon resin (d) comprises an aromatic resin (as discussed above) having an aromatic monomer content of at least about 40% by weight, at least 40% by weight (e.g., 40, 45, 50, 51, 55, 60% by weight, or more), about 40% to about 65% by weight, 40-65% by weight (e.g., 40, 42, 44, 45, 46, 48, 50, 52, 54, 55, 56, 58, 60, 62, 64, or 65% by weight), at least about 45% by weight, at least 45% by weight (e.g., 45, 50, 51, 55, 60% by weight, or more), about 45% to about 65% by weight, 45-65% by weight (e.g., 45, 47, 49, 50, 51, 53, 55, 57, 59, 60, 61, 63, or 65% by weight), at least 51% by weight (e.g., 51, 55, 60, 65% by weight, or more), about 51% to about 65% (e.g., 51, 52, 53, 54, 55, 56, 57, 58, 59, 60, 61, 62, 63, 64, or 65%), 51-65%, about 51% to about 60%, 51-60% (e.g., 51%, 52%, 53%, 54%, 55%, 56%, 57%, 58%, 59%, or 60%), about 51% to about 55%, or 51-55% (e.g, 51, 52, 53, 54, or 55%). The amounts of aromatic monomer content are weight percentages based upon the total weight of the respective hydrocarbon resin.

Liquid Plasticizers (Including Oils and Non-Oils)

As mentioned above, according to the first and third embodiments, the tread rubber composition comprises 10-30 phr of liquid plasticizer (e.g., 10, 11, 12, 13, 14, 15, 16, 17, 18, 19, 20, 21, 22, 23, 24, 25, 26, 27, 28, 29, or 30 phr) and according to the second embodiment, about 15 to about 25 phr or 15-25 phr of liquid plasticizer (e.g., 15, 16, 17, 18, 19, 20, 21, 22, 23, 24, or 25 phr). In certain embodiments of the first and third embodiments, the tread rubber composition comprises 10-25 phr of liquid plasticizer (e.g., 10, 11, 12, 13, 14, 15, 16, 17, 18, 19, 20, 21, 22, 23, 24, or 25), 15-30 phr (e.g., 15, 16, 17, 18, 19, 20, 21, 22, 23, 24, 25, 26, 27, 28, 29, or 30 phr), 15-25 phr of liquid plasticizer (e.g., 15, 16, 17, 18, 19, 20, 21, 22, 23, 24, or 25 phr), or 20-30 phr of liquid plasticizer (e.g., 20, 21, 22, 23, 24, 25, 26, 27, 28, 29, or 30 phr). The term liquid plasticizer is used to refer to plasticizer ingredients which are liquid at room temperature (i.e., liquid at 25° C. and above) and to distinguish hydrocarbon resin plasticizers which will generally be solid at room temperature. Generally, liquid plasticizers will have a Tg that below 0° C., generally well below such as less than −30° C., less than −40° C., or less than −50° C. In certain embodiments of the first-third embodiments, the liquid plasticizer has a Tg of less than 0° C. to −100° C., a Tg of −30° C. to −100° C., or a Tg of −50 to −100° C. As discussed in more detail below, liquid plasticizers include both oils (e.g., petroleum oils as well as plant-sourced oils) and other non-oil liquid plasticizers including, but not limited to, ether plasticizers, ester plasticizers, phosphate plasticizers, and sulfonate plasticizers. Moreover, the term liquid plasticizer is meant to encompass both free liquid plasticizer (which is usually added during the compounding process) and extender oil (which is used to extend a rubber). Thus, by stating that the tread rubber composition comprises, e.g., 10-30 phr of liquid plasticizer it should be understood that the total amount of any free liquid plasticizer and any extender oil is 13-30 phr. In certain (preferred) embodiments of the first-third embodiments, the tread rubber composition contains only free liquid plasticizer in one of the foregoing amounts (e.g., 10-30, 15-30 phr, 15-25 phr, etc.). In other embodiments of the first-third embodiments, the tread rubber composition contains only extender oil in one of the foregoing amounts (e.g., 10-30, 15-30 phr, 15-25 phr, etc.) such as from an oil-extended SBR. In yet other embodiments of the first-third embodiments, the tread rubber composition includes both free liquid plasticizer and extender oil, and at least 50% (e.g., 50%, 55%, 60%, 65%. 70%, 75%, 80% or more) by weight, preferably at least 60% by weight of the liquid plasticizer in the tread rubber composition is provided by free liquid plasticizer. In certain embodiments of the first-third embodiments, 60-80% by weight, 60-90% by weight, 60-100%, 70-80% by weight, 70-90% by weight, 70-100% by weight, 80-90% by weight, 80-100% by weight, or 90-100 by weight of the liquid plasticizer in the tread rubber composition is provided by free liquid plasticizer. In those embodiments of the first-third embodiments wherein an oil-extended rubber is used, the amount of oil used to prepare the oil-extended rubber may vary. In those embodiments of the first-third embodiments wherein an oil-extended rubber is used, the amount of oil used to prepare the oil-extended rubber may vary; in certain such embodiments, the amount of extender oil present in the oil-extended rubber (polymer) is 10-50 parts oil per 100 parts of rubber (e.g., 10, 15, 20, 25, 30, 35, 40, 45 or 50 parts of oil per 100 parts or rubber), preferably 10-40 parts oil per 100 parts or rubber or 20-40 parts oil per 100 parts of rubber. As a non-limiting example, extender oil could be used in an amount of 40 parts oil per 100 parts rubber in an SBR for (ii) which SBR is used in an amount of 10 parts (the 10 parts being the amount of polymer of the oil-extended SBR, as discussed previously) in the overall tread rubber composition and, thus, the amount of oil contributed by the oil-extended SBR to the tread rubber composition would be 4 phr. Oil-extension of rubbers (especially styrene-butadiene rubbers) can be beneficial to ease of processing or mixing when the SBR has a relatively high Mw and/or a relatively high Mooney viscosity. In certain embodiments of the first-third embodiments disclosed herein, the styrene-butadiene rubber as used in (ii) is an oil-extended styrene-butadiene rubber having a polymer Mooney viscosity $ML_{1+4}$ at 100° C. of at least 100. By polymer Mooney viscosity is meant the Mooney viscosity of the rubber or polymer before oil-extension. When an oil-extended rubber is used in the elastomer component of the tread rubber composition disclosed herein, the amounts specified for (i), (ii) and (iii) should be understood to refer to the amounts of rubber only rather than the amounts of oil-extended rubber. As used herein, oil refers to both petroleum based oils (e.g., aromatic, naphthenic, and low PCA oils) as well as plant oils (such as can be harvested from vegetables, nuts, and seeds). Plant oils will generally comprise triglycerides and the term should be understood to include synthetic triglycerides as well as those actually sourced from a plant.

According to the first-third embodiments, various types of processing and extender oils may be utilized, including, but not limited to aromatic, naphthenic, and low PCA oils (petroleum-sourced or plant-sourced). Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Exemplary petroleum-sourced low PCA oils include mild extraction solvates (MES), treated distillate aromatic extracts (TDAE), TRAE, and heavy naphthenics. Exemplary MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Exemplary TDAE oils are available as TYREX 20 from EXXON MOBIL, VIVATEC 500, VIVATEC 180, and ENERTHENE 1849 from BP, and EXTENSOIL 1996 from REPSOL. Exemplary heavy naphthenic oils are available as SHELLFLEX 794, ERGON BLACK OIL, ERGON H2000, CROSS C2000, CROSS C2400, and SAN JOAQUIN 2000L. Exemplary low PCA oils also include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, camellia oil, jojoba oil, macadamia nut oil, coconut oil, and palm oil. The foregoing processing oils can be used as an extender oil, i.e., to prepare an oil-extended polymer or copolymer or as a processing or free oil.

As mentioned above, according to the first-third embodiments, the liquid plasticizer may include a non-oil plasticizer, non-limiting examples of which include ether plasticizers, ester plasticizers, phosphate plasticizers, and sulfonate plasticizers. Exemplary ether plasticizers include polyethylene glycols and polypropylene glycols. Exemplary ester plasticizers include triesters and diesters in particular (which may be selected from the group consisting of di- and triesters of carboxylic acid, of phosphoric acid, or of sulphonic acid, and mixtures of these triesters). More specifically, exemplary carboxylic acid ester plasticizers include compounds selected from the group consisting of trimellitates, pyromellitates, phthalates, 1,2-cyclohexanedicarboxylates, adipates, azelates, sebacates, glyercol triesters, and mixtures of the foregoing. More specifically as to glycerol triesters, these may include more than 50% by weight, more preferably more than 80% by weight of an unsaturated C18 fatty acid (e.g., oleic acid, linoleic acid, linolenic acid, and mixtures thereof). Other exemplary carboxylic acid ester plasticizers include stearic acid esters, ricinoleic acid esters, phthalic acid esters (e.g., di-2-ethylhexyl phthalate and diosodecyl phthalate), isophthalic acid esters, tetrahydrophthalic acid esters, adipic acid esters (e.g., di(2-ethylhexyl) adipate and diisooctyl adipate), malic acid esters, sebic acid esters (e.g., di(2-ethylhexyl)sebacate and diisooctyl sebacate), and fumaric acid esters. Exemplary phosphate plasticizers include those with a tri-hydrocarbyl phosphate and di-hydrocarbyl phosphate structures (where each hydrocarbyl is independently selected from alkyl of C1 to C12, preferably C1 to C8, and aromatic of C6 to C12 both substituted and un-substituted, preferably when aromatic C6 either substituted or un-substituted). More specifically, exemplary phosphate plasticizers include trimethyl phosphate, triethyl phosphate, tributyl phosphate, trioctyl phosphate, dioctyl phosphate, 2-ethylhexyl diphenyl phosphate, tributoxyethyl phosphate, triphenyl phosphate, cresyl diphenyl phosphate, isodecyl diphenyl phosphate, tricresyl phosphate, tritolyl phosphate, trixylenyl phosphate, tris(chloroethyl) phosphate, and diphenyl mono-o-xenyl phosphate. Exemplary sulfonate plasticizers include sulfonic acid esters such as sulfone butylamide, toluenesulfonamide, N-ethyltoluenesulfonamide, and N-cyclohexyl-p-toluencesulfonamide. Of the foregoing non-oil liquid plasticizers, phosphate plasticizers, in particular phosphoric acid derivatives (which can be understood as being phosphate esters) are preferred.

According to first-third embodiments, the Tg of the oil or oils used may vary. In certain embodiments of the first-third embodiments, any oil utilized has a Tg of about −40 to about −100° C., −40 to −100° C. (e.g., −40, −45, −50, −55, −60, −65, −70, −75, −80, −85, −90, −95, or −100° C.), about −40 to about −90° C., −40 to −90° C. (e.g., −40, −45, −50, −55, −60, −65, −70, −75, −80, −85, or −90° C.), about −45 to about −85° C., −45 to −85° C. (e.g., −45, −50, −55, −60, −65, −70, −75, −80, or −85° C.), about −50 to about −80° C., or −50 to −80° C. (e.g., −50, −55, −60, −65, −70, −75, or −80° C.).

In certain embodiments of the first-third embodiments, the tread rubber composition contains less than 5 phr (e.g., 4.5, 4, 3, 2, 1, or 0 phr) of MES or TDAE oil, or even no MES or TDAE oil (i.e., 0 phr). In certain embodiments of the first-third embodiments, the tread rubber composition contains no petroleum oil (i.e., 0 phr) and instead any oil utilized is a plant oil. In certain embodiments of the first-third embodiments, the tread rubber composition contains soybean oil in one of the above-mentioned amounts. In certain embodiments of the first-third embodiments, the tread rubber composition contains no sunflower oil (i.e., 0 phr).

In certain embodiments of the first-third embodiments, the tread rubber composition includes one or more ester plasticizers. Suitable ester plasticizers are known to those of skill in the art and include, but are not limited to, phosphate esters, phthalate esters, adipate esters and oleate esters (i.e., derived from oleic acid). Taking into account that an ester is a chemical compound derived from an acid wherein at least one —OH is replaced with an —O— alkyl group, various alkyl groups may be used in suitable ester plasticizers for use in the tread rubber compositions, including generally linear or branched alkyl of C1 to C20 (e.g., C1, C2, C3, C4, C5, C6, C7, C8, C9, C10, C11, C12, C13, C14, C15, C16, C17, C18, C19, C20), or C6 to C12. Certain of the foregoing esters are based upon acids which have more than one —OH group and, thus, can accommodate one or more than one O-alkyl group (e.g., trialkyl phosphates, dialkyl phthalates, dialkyl adipates). Non-limiting examples of suitable ester plasticizers include trioctyl phosphate, dioctyl phthalate, dioctyl adipate, nonyl oleate, octyl oleate, and combinations thereof. The use of an ester plasticizer such as one or more of the foregoing may be beneficial to the snow or ice performance of a tire made from a tread rubber composition containing such ester plasticizer at least in part due to the relatively low Tg of ester plasticizers. In certain embodiments of the first-third embodiments, the tread rubber composition includes one or more ester plasticizers having a Tg of −40° C. to −70° C. (e.g., −40, −45, −50, −55, −60, −65, or −70° C.), or −50° C. to −65° C. (e.g., −50, −51, −52, −53, −54, −55, −56, −57, −58, −59, −60, −61, −62, −63, −64, or −65° C.). In those embodiments of the first-third embodiments wherein one or more ester plasticizers is utilized the amount utilized may vary. In certain embodiments of the first-third embodiments, one or more ester plasticizers are utilized in a total amount of 1-12 phr (e.g., 1, 2, 3, 4, 5, 6, 7, 8, 9, 10, 11, or 12 phr), 1-10 phr (e.g., 1, 2, 3, 4, 5, 6, 7, 8, 9, or 10 phr), 2-6 phr (e.g., 2, 3, 4, 5, or 6 phr) or 2-5 phr (e.g., 2, 3, 4, or 5 phr). In certain embodiments of the first-third embodiments, one or more ester plasticizers is used in combination with oil in one of the foregoing amounts.

In certain preferred embodiments of the first-third embodiments, the amount of hydrocarbon resin (d) used in the tread rubber composition is greater than the amount of liquid plasticizer (e). In certain such embodiments, the hydrocarbon resin (d) and liquid plasticizer (e) are present in a weight ratio of at least 1.5:1, preferably 1.5:1 to 4:1 (e.g., 1.5:1, 2:1, 2.5:1, 3:1, 3.5:1, or 4:1, more preferably 1.5:1 to 3:1 (e.g., 1.5:1, 1.6:1, 1.7:1, 1.8:1, 1.9:1, 2:1, 2.1:1, 2.2:1, 2.3:1, 2.4:1, 2.5:1, 2.6:1, 2.7:1, 2.8:1, 2.9:1, or 3:1) or 1.5 to 2:1 (e.g., 1.5:1, 1.6:1, 1.7:1, 1.8:1, 1.9:1, or 2:1).

As mentioned above, according to the first and third embodiments, the total amount of hydrocarbon resin (d) and liquid plasticizer (e) is at least 40 phr (e.g., 40 phr, 42 phr, 44, phr, 45 phr, 46, phr, 48 phr, 50 phr, 52 phr, 54 phr, 55 phr, 56 phr, 58 phr, 60 phr, 62 phr, 64 phr, 65 phr, or more). According to the second embodiment and in certain preferred embodiments of the first and third embodiments, the total amount of hydrocarbon resin (d) and liquid plasticizer (e) is at least 50 phr (e.g., 50 phr, 52 phr, 54 phr, 55 phr, 56 phr, 58 phr, 60 phr, 62 phr, 64 phr, 65 phr, 66 phr, 68 phr, 70 phr or more). In certain embodiments of the first-third embodiments, the total amount of hydrocarbon resin (d) and liquid plasticizer (e) used in the tread rubber composition is no more than 59 phr (e.g., 59, 55, 54, 50, 49, 45, 44, or 40 phr, or less). In other embodiments of the first-third embodiments, the total amount of hydrocarbon resin (d) and liquid plasticizer (e) is no more than 70 phr (e.g., 70, 65, 60, 55, 50, 45, or 40 phr or less), preferably no more than 65 phr (e.g., 65, 60, 55, 50, 45, or 40 phr). In certain embodiments of the first-third embodiments, the total amount of hydrocarbon resin (d) and liquid plasticizer (e) is 50-70 phr (e.g., 50, 52, 54, 55, 56, 58, 60, 62, 64, 65, 66, 68, or 70 phr), 50-59 phr (e.g., 50, 51, 52, 53, 54, 55, 56, 57, 58, or 59 phr), 40-70 phr (e.g., 40, 42, 44, 45, 46, 48, 50, 52, 54, 55, 56, 58, 60, 62, 64, 65, 66, 68, or 70 phr), 40-59 phr, 40-55 phr, 45-59 phr, or 45-55 phr.

Cure Package

As discussed above, according to the first-third embodiments disclosed herein, the tread rubber composition includes (comprises) a cure package. Although the contents of the cure package may vary according to the first-third embodiments, generally, the cure package includes at least one of: a vulcanizing agent; a vulcanizing accelerator; a vulcanizing activator (e.g., zinc oxide, stearic acid, and the like); a vulcanizing inhibitor; and an anti-scorching agent. In certain embodiments of the first-third embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Various vulcanizing inhibitors and anti-scorching agents are known in the art and can be selected by one skilled in the art based on the vulcanizate properties desired.

Examples of suitable types of vulcanizing agents for use in certain embodiments of the first-third embodiments, include but are not limited to, sulfur or peroxide-based curing components. Thus, in certain such embodiments, the curative component includes a sulfur-based curative or a peroxide-based curative. In preferred embodiments of the first-third embodiments, the vulcanizing agent is a sulfur-based curative; in certain such embodiments the vulcanizing agent consists of (only) a sulfur-based curative. Examples of specific suitable sulfur vulcanizing agents include "rubber-maker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents may be used in certain embodiments of the first-third embodiments in an amount ranging from 0.1 to 10 phr (e.g., 0.1, 0.5, 1, 2, 3, 4, 5, 6, 7, 8, 9, or 10 phr), including from 1 to 7.5 phr, including from 1 to 5 phr, and preferably from 1 to 3.5 phr (e.g., 1, 1.5, 2, 2.5, 3, or 3.5 phr).

Vulcanizing accelerators are used to control the time and/or temperature required for vulcanization and to improve properties of the vulcanizate. Examples of suitable vulcanizing accelerators for use in certain embodiments of the first-third embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr (e.g., 0.1, 0.5, 1, 2, 3, 4, 5, 6, 7, 8, 9, or 10 phr), preferably 0.5 to 5 phr (e.g., 0.5, 1, 1.5, 2, 2.5, 3, 3.5, 4, 4.5, or 5 phr). Preferably, any vulcanization accelerator used in the tread rubber compositions of the first-third embodiments excludes any thiurams such as thiuram monosulfides and thiuram polysulfides (examples of which include TMTM (tetramethyl thiuram monosulfide), TMTD (tetramethyl thiuram disulfide), DPTT (dipentamethylene thiuram tetrasulfide), TETD (tetraethyl thiuram disulfide), TiBTD (tetraisobutyl thiuram disulfide), and TBzTD (tetrabenzyl thiuram disulfide)); in other words, the tread rubber compositions of the first-third embodiments preferably contain no thiuram accelerators (i.e., 0 phr).

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, in certain embodiments of the first-third embodiments the amount of vulcanization activator used ranges from 0.1 to 6 phr (e.g., 0.1, 0.5, 1, 1.5, 2, 2.5, 3, 3.5, 4, 4.5, 5, 5.5, or 6 phr), preferably 0.5 to 4 phr (e.g., 0.5, 1, 1.5, 2, 2.5, 3 3.5, or 4 phr). In certain embodiments of the first-third embodiments, one or more vulcanization activators are used which includes one or more thiourea compounds (used in the of the foregoing amounts), and optionally in combination with one or more of the foregoing vulcanization activators. Generally, a thiourea compound can be understood as a compound having the structure $(R^1)(R^2)NS(=C)N(R^3)(R^4)$ wherein each of R', $R^2$, $R^3$, and $R^4$ are independently selected from H, alkyl, aryl, and N-containing substituents (e.g., guanyl). Optionally, two of the foregoing structures can be bonded together through N (removing one of the R groups) in a dithiobiurea compound. In certain embodiments, one of $R^1$ or $R^2$ and one of $R^3$ or $R^4$ can be bonded together with one or more methylene groups ($—CH_2—$) therebetween. In certain embodiments of the first-third embodiments, the thiourea has one or two of R', $R^2$, $R^3$ and $R^4$ selected from one of the foregoing groups with the remaining R groups being hydrogen. Exemplary alkyl include C1-C6 linear, branched or cyclic groups such as methyl, ethyl, propyl, iso-propyl, butyl, iso-butyl, pentyl, hexyl, and cyclohexyl. Exemplary aryl include C6-C12 aromatic groups such as phenyl, tolyl, and naphthyl. Exemplary thiourea compounds include, but are not limited to, dihydrocarbylthioureas such as dialkylthioureas and diarylthioureas. Non-limiting examples of particular thiourea compounds include one or more of thiourea, N,N'-diphenylthiourea, trimethylthiourea, N,N'-diethylthiourea (DEU), N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di(p-tolyl) thiourea, 1,1-diphenyl-2-thiourea, 2,5-dithiobiurea, guanylthiourea, 1-(1-naphthyl)-2-thiourea, 1-phenyl-2-thiourea, p-tolylthiourea, and o-tolylthiourea. In certain embodiments of the first-third embodiments, the activator includes at least one thiourea compound selected from thiourea, N,N'-diethylthiourea, trimethylthiourea, N,N'-diphenylthiourea, and N-N'-dimethylthiourea.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, in certain embodiments of the first-third embodiments the amount of vulcanization inhibitor is 0.1 to 3 phr (e.g., 0.1, 0.5, 1, 1.5, 2, 2.5, or 3 phr), preferably 0.5 to 2 phr (e.g., 0.5, 1, 1.5, or 2 phr).

Preparing the Rubber Compositions

The particular steps involved in preparing the tread rubber compositions of the first-third embodiments disclosed herein are generally those of conventionally practiced methods comprising mixing the ingredients in at least one non-productive master-batch stage and a final productive mixing stage. In certain embodiments of the first-third embodiments, the tread rubber composition is prepared by combining the ingredients for the rubber composition (as disclosed above) by methods known in the art, such as, for example, by kneading the ingredients together in a Banbury mixer or on a milled roll. Such methods generally include at least one non-productive master-batch mixing stage and a final productive mixing stage. The term non-productive master-batch stage is known to those of skill in the art and generally understood to be a mixing stage (or stages) where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the first-third embodiments, the tread rubber composition is prepared by a process comprising more than one non-productive master-batch mixing stage.

In certain embodiments of the first-third embodiments, the tread rubber composition is prepared by a process wherein the master-batch mixing stage includes at least one of tandem mixing or intermeshing mixing. Tandem mixing can be understood as including the use of a mixer with two mixing chambers with each chamber having a set of mixing rotors; generally, the two mixing chambers are stacked together with the upper mixer being the primary mixer and the lower mixer accepting a batch from the upper or primary mixer. In certain embodiments, the primary mixer utilizes intermeshing rotors and in other embodiments the primary mixer utilizes tangential rotors. Preferably, the lower mixer utilizes intermeshing rotors. Intermeshing mixing can be understood as including the use of a mixer with intermeshing rotors. Intermeshing rotors refers to a set of rotors where the major diameter of one rotor in a set interacts with the minor diameter of the opposing rotor in the set such that the rotors intermesh with each other. Intermeshing rotors must be driven at an even speed because of the interaction between the rotors. In contrast to intermeshing rotors, tangential rotors refers to a set of rotors where each rotor turns independently of the other in a cavity that may be referred to as a side. Generally, a mixer with tangential rotors will include a ram whereas a ram is not necessary in a mixer with intermeshing rotors.

Generally, the rubbers (or polymers) and at least one reinforcing filler (as well as any silane coupling agent and liquid plasticizer) will be added in a non-productive or master-batch mixing stage or stages. Generally, at least the vulcanizing agent component and the vulcanizing accelerator component of a cure package will be added in a final or productive mixing stage.

In certain embodiments of the first-third embodiments, the tread rubber composition is prepared using a process wherein at least one non-productive master batch mixing stage is conducted at a temperature of about 130° C. to about 200° C. In certain embodiments of the first-third embodiments, the tread rubber composition is prepared using a final productive mixing stage conducted at a temperature below the vulcanization temperature in order to avoid unwanted pre-cure of the rubber composition. Therefore, the temperature of the productive or final mixing stage generally should not exceed about 120° C. and is typically about 40° C. to about 120° C., or about 60° C. to about 110° C. and, especially, about 75° C. to about 100° C. In certain embodiments of the first-third embodiments, the tread rubber composition is prepared according to a process that includes at least one non-productive mixing stage and at least one productive mixing stage. The use of silica fillers may optionally necessitate a separate re-mill stage for separate addition of a portion or all of such filler. This stage often is performed at temperatures similar to, although often slightly lower than, those employed in the masterbatch stage, i.e., ramping from about 90° C. to a drop temperature of about 150° C.

Tire Tread Properties

The use of the tire tread rubber composition of the first-third embodiments in tires, may result in a tire having improved or desirable tread properties. These improved or desirable properties may include one or more of rolling resistance, snow or ice traction, wet traction, dry handling, and wear. While these properties may be measured by various methods, the values referred to herein for rolling resistance, snow or ice traction, wet traction, and dry handling refer to tan δ values measured at the following temperatures and according to the following procedures. Tan δ values can be measured with a dynamic mechanical thermal spectrometer (Eplexor® 500N from Gabo Qualimeter Testanlagen GmbH of Ahiden, Germany) generally following the guidelines of ASTM D5992-96 (2011) and under the following conditions: measurement mode: tensile test mode; measuring frequency: 52 Hz; applying 0.2% strain from −50 to −5° C. and 1% strain from −5 to 65° C.; collecting data approximately every 1° C. in order to provide measurements at temperatures of −30° C., 0° C., 30° C., and 60° C.; sample shape: 4.75 mm wide×29 mm long×2.0 mm thick. Measurement is made upon a cured sample of rubber (cured for 15 minutes at 170° C.). A rubber composition's tan δ at −30° C. is indicative of its snow or ice traction when incorporated into a tire tread, tan δ at 0° C. is indicative of its wet traction when incorporated into a tire tread, tan δ at 30° C. is indicative of its dry handling when incorporated into a tire tread and its tan δ at 60° C. is indicative of its rolling resistance when incorporated into a tire tread.

In certain embodiments of the first-third embodiments, the rubber composition has a value for tan δ at 60° C. of 0.23 to 0.29 (e.g., 0.23, 0.24, 0.25, 0.26, 0.27, 0.28, or 0.29), 0.24 to 0.29 (e.g., 0.24, 0.25, 0.26, 0.27, 0.28, or 0.29), 0.25 to 0.29 (e.g., 0.25, 0.26, 0.27, 0.28, or 0.29), 0.23 to 0.28 (e.g., 0.23, 0.24, 0.25, 0.26, 0.27, or 0.28), 0.24 to 0.28 (e.g., 0.24, 0.25, 0.26, 0.27, or 0.28). A tan δ at 60° C. within one of the foregoing ranges can be understood as being indicative of a tire (or more specifically, a tire tread) with moderate rolling resistance (as opposed to a tire with low rolling resistance which would generally be indicated by a tan δ at 60° C. of less than or equal to 0.2). In certain embodiments of the first-third embodiments, the value for tan δ at 60° C. is combined with at least one of the following: (a) a value for tan δ at −30° C. of at least 1.1 times the tan δ at 60° C. value (e.g., 1.1 times, 1.2 times, 1.3 times, 1.4 times, 1.5 times, 1.6 times, 1.7 times, or more), preferably between 1.1 times and 1.5 times the tan δ at 60° C. value (e.g., 1.1 times, 1.2 times, 1.3 times, 1.4 times, or 1.5 times); (b) a value for tan δ at 0° C. of at least 1.2 times the tan δ at 60° C. value (e.g., 1.2 times, 1.3 times, 1.4 times, 1.5 times, 1.6 times, 1.7 times, 1.8 times, 1.9 times, or more), preferably between 1.2 and 1.7 times the tan δ at 60° C. value (e.g., 1.2 times, 1.3 times, 1.4 times, 1.5 times, 1.6 times, or 1.7 times), more preferably between 1.4 and 1.7 times the tan δ at 60° C. value (e.g., 1.4 times, 1.5 times, 1.6 times, or 1.7 times); or (c) a value for tan δ at 30° C. of at least 1.1 times the tan δ at 60° C. value (e.g., 1.1 times, 1.2 times, 1.3 times, 1.4 times, 1.5 times, 1.6 times, 1.7 times, or more), preferably 1.1 times to 1.5 times the tan δ at 60° C. value (e.g., 1.1 times, 1.2 times, 1.3 times, 1.4 times, or 1.5 times), more preferably between 1.2 and 1.5 times the tan δ at 60° C. value (e.g., 1.2 times, 1.3 times, 1.4 times, or 1.5 times); in certain such embodiments, the value for tan δ at 60° C. is combined with each of (a), (b), and (c). In certain embodiments of the first-third embodiments, one of the foregoing values for tan δ at 60° C. (e.g., 0.23 to 0.29, 0.23 to 0.28, etc.) is combined with (a) a value for δ at −30° C. of between 1.1 times and 1.5 times (e.g., 1.1 times, 1.2 times, 1.3 times, 1.4 times, or 1.5 times) the tan δ at 60° C. value. In certain embodiments of the first-third embodiments, one of the foregoing values for tan δ at 60° C. (e.g., 0.23 to 0.29, 0.23 to 0.28, etc.) is combined with (b) a value for δ at 0° C. of between 1.2 and 1.7 times (e.g., 1.2 times, 1.3 times, 1.4 times, 1.5 times, 1.6 times, or 1.7 times) the tan δ at 60° C. value or between 1.4 and 1.7 times the tan δ at 60° C. value. In certain embodiments of the first-third embodiments, one of the foregoing values for tan δ at 60° C. (e.g., 0.23 to 0.29, 0.23 to 0.28, etc.) is combined with (c) a value for δ at 30° C. of between 1.1 and 1.5 times (e.g., 1.1 times, 1.2 times, 1.3 times, 1.4 times, or 1.5 times) the tan δ at 60° C. value or between 1.2 and 1.5 times the tan δ at 60° C. value. In certain embodiments of the first-third embodiments, one of the foregoing values for tan δ at 60° C. (e.g., 0.23 to 0.29, 0.23 to 0.28, etc.) is combined with one of the foregoing values for tan δ at −30° C., one of the foregoing values for tan δ at 0° C., and one of the foregoing values for tan δ at 30° C.

In certain embodiments of the first-third embodiments, the rubber composition has a room temperature Eb of at least 450% (e.g., 450%, 455%, 460%, 465%, 470%, 475%, 480%, 485%, 490%, 495%, 500%, 505%, 510%, 515%, 520%, 525%, 530%, 535%, 540%, 545%, 550%, 555%, 560%, 565%, 570%, 575% 580%, 585%, 590%, 595%, 600%, or more) or 450 to 600% or a sub-range within that range, preferably at least 500% (e.g., 500%, 505%, 510%, 515%, 520%, 525%, 530%, 535%, 540%, 545%, 550%, 555%, 560%, 565%, 570%, 575% 580%, 585%, 590%, 595%, 600%, or more) or within the range of 500 to 600% or a sub-range within that range. The foregoing room temperature Eb values can be determined according to the procedure described in the Examples section and refer to measurements made at 23° C.

In certain embodiments of the first-third embodiments, the rubber composition has a hot Eb of at least 400%, (e.g., 400%, 410%, 420%, 430%, 440%, 450%, 460%, 470%, 480%, 490%, 500%, 510%, 520%, 530%, 540%, 550%, 560%, 570%, 575%, or more) or 400 to 570% or a sub-range within that range, preferably at least 450% (e.g., 450%, 460%, 470%, 480%, 490%, 500%, 510%, 520%, 530%, 540%, 550%, 560%, 570%, 575%, or more) or within a range of 450-575% or a sub-range within that range. The foregoing hot Eb values can be determined according to the procedure described in the Examples section and refer to measurements made at 100° C. Generally, a hot Eb value for a given tread rubber composition will be lower (i.e., less than) the room temperature Eb for that tread rubber composition.

In certain embodiments of the first-third embodiments, the rubber composition has a hot Eb×Tb of at least 3000 (e.g., 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150 4200, 4250, 4300 or more), preferably at least 3300 (e.g., 3300, 3350, 3400, 3450, 3500, 3550, 3600, 3650, 3700, 3750, 3800, 3850, 3900, 3950, 4000, 4050, 4100, 4150 4200, 4250, 4300 or more), more preferably at least 3500 (e.g., 3500, 3550, 3600, 3650, 3700, 3750, 3800, 3850, 3900, 3950, 4000, 4050, 4100, 4150 4200, 4250, 4300 or more). In certain such embodiments, the hot Tb×Eb is 3000-4300, preferably 3300-4300 or 3300 to 4300 or a sub-range within the foregoing, and more preferably 3500-4300 or 3500 to 4000 or a sub-range within one of the foregoing ranges. The hot Tb×Eb is calculated by multiplying the hot Tb with the hot Eb value, which values can be determined according to the procedure described in the Examples and refer to measurements made at 100° C.

Examples

The following prophetic examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that tire tread rubber compositions according to the present disclosure can be made using different SBRs, different polybutadienes, different natural rubbers (and/or polyisoprenes), different reinforcing silica filler, different (or no) carbon black, different hydrocarbon resin, and different liquid plasticizing agents, generally in connection with the teachings provided herein and as fully disclosed in the preceding paragraphs. It should also be understood that the foregoing ingredients can differ in relative amount, composition, or both from those used in the examples (i.e., as fully as disclosed in the preceding paragraphs).

As provided in Table 1, tread rubber compositions can be prepared using ingredients in accordance with the amounts and types disclosed in the preceding paragraphs to formulate an inventive composition listed as Example 1. Comparative tread rubber compositions can also be prepared using varying types and/or amounts of certain ingredients and are listed in Table 1 as Control 1, Control 2, Control 3, Control 4, and Control 5. Notably, each of Control B-E uses at least one ingredient outside of the amounts and/or types listed for the rubber composition of Example 1. When amounts are indicated to be within ranges (e.g., for SBR-1 a range of 30-40), that ingredient can be understood as being in the same amount for each composition unless indicated to the contrary (i.e., the amount of SBR-1 is the same for Example 1, Control 2, Control 3 and Control 5, but is more for Control 1 and absent for Control 4, but is replaced with SBR-2). All ingredients in Table 1 are listed in amounts of phr.

TABLE 1

|  | Example 1 | Control 1 | Control 2 | Control 3 | Control 4 | Control 5 |
|---|---|---|---|---|---|---|
| SBR-1[1] | Within range of 10-20 | Above range of 10-25 | Within range of 10-20 | Within range of 10-20 | 0 | Within range of 10-20 |
| SBR-2[2] | 0 | 0 | 0 | 0 | Within range of 10-20 | 0 |
| Polybutadiene[3] | Within range of 70 to 80 | Below range of 70 to 80 | Within range of 70 to 80 | Within range of 70 to 80 | Within range of 70 to 80 | Within range of 70 to 80 |
| Natural rubber | Within range of 10 to 20 | Below range of 10 to 20 | Within range of 10 to 20 | Within range of 10 to 20 | Within range of 10 to 20 | Within range of 10 to 20 |
| Carbon black | ≤10 phr | ≤10 phr | >20 phr | ≤10 phr | ≤10 phr | Greater than Control 2 |
| Silica[4] | Within range of 101 to 150 | Within range of 101 to 150 | Below range of 101 to 150 | Within range of 101 to 150 | Within range of 101 to 150 | Within range of 101 to 150 |
| Silica coupling agent | Ratio 1/10 to silica | Ratio 1/10 to silica | Ratio 1/10 to silica | Ratio 1/10 to silica | Ratio 1/10 to silica | Ratio 1/10 to silica |
| Liquid plasticizer[5] | Within range of 15 to 25 | Within range of 15 to 25 | Within range of 15 to 25 | Above range of 10 to 30 | Within range of 15 to 25 | Within range of 15 to 25 |
| Hydrocarbon resin[6] | Within range of 30 to 50 | Within range of 30 to 50 | Within range of 30 to 50 | Below range of 30 to 50 | Within range of 30 to 50 | Within range of 30 to 50 |
| Vulcanizing agent[7] | 1.9 | 1.9 | 1.9 | 1.9 | 1.9 | 1.9 |
| Vulcanizing accelerators | 4.62 | 4.62 | 4.62 | 4.62 | 4.62 | 4.62 |
| Processing aids, antioxidants, & vulcanization activators | 9.23 | 9.23 | 9.23 | 9.23 | 9.23 | 9.23 |

[1]SBR-1 is a functionalized copolymer having a Tg of less than −40° C..
[2]SBR-2 is a non-functionalized copolymer having a Tg of greater than −40° C., a styrene content of more than 25%, and a vinyl bond content above the range of 30 to 40%. This SBR is also oil-extended in an amount of 37.5 parts per 100 parts of rubber. The amount listed in Table 1 is the amount of rubber contributed by the oil-extended SBR and does not include the oil contribution of SBR-1.
[3]High cis-polybutadiene having a cis-1,4-bond content of at least 95% and a Tg in the range of −105 to −108° C.
[4]Reinforcing silica filler having a BET surface area in the range of 150 to 300 m$^2$/g.
[5]Plant-sourced oil.
[6]Aromatic resin having a Tg in the range of 30 to 50° C.
[7]Sulfur Table 2 provides predicted properties for each of the rubber compositions from Table 1. Notably, the tan δ values can be measured in accordance with the Gabo procedures described in the above paragraphs. The room temperature Eb represents an elongation at break measurement (in terms of % elongation), providing an indication of a rubber composition's tear resistance. The abbreviation Tb refers to tensile at break, which measurement (made in units of MPa) provides an indication of a rubber composition's strength by measuring the maximum stress it can withstand before breaking. Eb and Tb can be measured following the guidelines, but not restricted to, the standard procedure described in ASTM D-412, with dumbbell-shaped samples having a cross-section dimension of 4 mm in width and 1.9 mm in thickness at the center.

During measurement, specimens may be strained at a constant rate (20% per second) and the resulting force recorded as a function of extension (strain). Room temperature measurements refer to measurements taken at 23° C. and hot measurements refer to measurements taken at 100° C.

TABLE 2

|  | Example 1 | Control 1 | Control 2 | Control 3 | Control 4 | Control 5 |
|---|---|---|---|---|---|---|
| Tan δ at 60° C. | 0.2439 | 0.2333 | 0.2583 | 0.2368 | 0.2518 | 0.2678 |
| Tan δ at 30° C. | Within range of 1.2x to 1.5x tan δ at 60° C. | Within range of 1.2x to 1.5x tan δ at 60° C. | Within range of 1.2x to 1.5x tan δ at 60° C. | Below range of 1.2x to 1.5x tan δ at 60° C. | Within range of 1.2x to 1.5x tan δ at 60° C. | With range of 1.1x to 1.5x tan δ at 60° C. |
| Tan δ 0° C. | Within range of 1.4x to 1.7x tan δ at 60° C. | Within range of 1.4x to 1.7x tan δ at 60° C. | Within range of 1.4x to 1.7x tan δ at 60° C. | Below range of 1.4x to 1.7x tan δ at 60° C. | Within range of 1.4x to 1.7x tan δ at 60° C. | Within range of 1.4x to 1.7x tan δ at 60° C. |
| Elastomer component Tg | Within range of −90 to −100° C. | Below range of −90 to −100° C. | Within range of −90 to −100° C. | Within range of −90 to −100° C. | Below range of −90 to −100° C. | Within range of −90 to −100° C. |

TABLE 2-continued

|  | Example 1 | Control 1 | Control 2 | Control 3 | Control 4 | Control 5 |
|---|---|---|---|---|---|---|
| Room temperature Eb | Within ≥500% | Less than 500% | Less than 450% | Within ≥500% | Within ≥500% | Less than 450% |
| Hot Eb | Within ≥450% | Less than 400% | Within ≥400% | Within ≥450% | Within ≥450% | Less than 400% |
| Hot Eb*Tb | Within ≥3500 | Less than 3000 | Less than 3000 | Within ≥3500 | Within ≥3500 | Less than 3000 |

As a review of the data in Table 2 reveals, when compared to the rubber composition of inventive Example 1, each of the comparative rubber compositions of Control 1-Control 5 exhibit at least one property that is worse than or outside the ranges presented for inventive Example 1.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A tire tread rubber composition made of ingredients comprising:
    a. 100 parts of an elastomer component comprising:
        i. 70-85 parts of polybutadiene having a cis bond content of at least 95% and a Tg of −101 to −110° C.,
        ii. 10-25 parts of at least one styrene-butadiene rubber functionalized with a silica-reactive functional group and having a Tg of −40 to −75° C.,
        iii. 10-20 parts of natural rubber, polyisoprene, or a combination thereof;
    b. at least one reinforcing silica filler in an amount of 101-150 phr having a surface area of about 150 to about 300 m$^2$/g;
    c. no more than 20 phr of carbon black filler;
    d. 30-50 phr of at least one hydrocarbon resin having a Tg of about 30 to about 50° C.;
    e. 10-30 phr of liquid plasticizer; and
    f. a cure package,
    wherein the total amount of (d) and (e) is 40-70 phr.

2. The tire tread rubber composition of claim 1, wherein the amount of (i) is 71-80 parts.

3. The tire tread rubber composition of claim 1, wherein the hydrocarbon resin of (d) comprises an aromatic resin.

4. The tire tread rubber composition of claim 1, wherein the styrene-butadiene rubber of (ii) has a styrene content of no more than about 25%.

5. The tire tread rubber composition of claim 1, wherein the styrene-butadiene rubber of (ii) has a Tg of about −50 to about −75° C.

6. The tire tread rubber composition of claim 1, wherein the elastomer component has an average Tg of −90 to −105° C.

7. The tire tread rubber composition of claim 1, wherein the liquid plasticizer of (e) consists of one or more plant oils.

8. The tire tread rubber composition of claim 1, wherein the total amount of (d) and (e) is 50 to 60 phr.

9. The tire tread rubber composition of claim 1, wherein (d) and (e) are present in a weight ratio of 1.5/1 to 4/1.

10. The tire tread rubber composition of claim 1, wherein (a) (iii) consists of natural rubber.

11. The tire tread rubber composition of claim 1, wherein the elastomer component has an average Tg of −80 to −105° C.

12. The tire tread rubber composition of claim 1, wherein the rubber composition has a value for tan δ at 60° C. of 0.23 to 0.29 and meets at least one of the following
   a. has a value for tan δ at −30° C. of at least 1.1 times the tan δ at 60° C. value;
   b. has a value for tan δ at 0° C. of at least 1.2 times the tan δ at 60° C. value; or
   c. has a value for tan δ at 30° C. of at least 1.1 times the tan δ at 60° C. value.

13. The tire tread rubber composition of claim 12, wherein each of (a), (b), and (c) are met.

14. The tire tread rubber composition of claim 1, wherein at least one of the following is met:
   (d) has an Eb at 23° C. of at least 450%,
   (e) has an Eb at 100° C. of at least 400%, or
   (f) has an Tb×Eb of at least 3000.

15. The tire tread rubber composition of claim 14, wherein each of (d)-(f) is met.

16. A tire incorporating the tire tread rubber composition of claim 1.

17. A tire tread rubber composition made of ingredients comprising:
   a. 100 parts of an elastomer component comprising:
      i. about 70 to about 80 parts of polybutadiene having a cis bond content of at least 95% and a Tg of less than −101° C.,
      ii. about 10 to about 20 parts of at least one styrene-butadiene rubber having a Tg of less than −40° C.
      iii. about 15 to about 25 parts of natural rubber, polyisoprene, or a combination thereof;
   b. about 110 to about 130 phr of at least one reinforcing silica filler having a surface area of about 150 to about 300 m$^2$/g;
   c. no more than about 10 phr of carbon black filler;
   d. about 35 to about 45 phr of at least one hydrocarbon resin having a Tg of about 30 to about 50° C.;
   e. about 15 to about 25 phr of liquid plasticizer; and
   f. a cure package;
   wherein the total amount of (d) and (e) is at least about 50 phr.

18. The tire tread rubber composition of claim 17, wherein the styrene-butadiene rubber of (ii) has a Tg of about −50 to about −75° C. and is functionalized with a silica-reactive functional group.

19. The tire tread rubber composition of claim 17, wherein the total amount of (d) and (e) is no more than 65 phr and (d) and (e) are present in a weight ratio of 1.5/1 to 4/1.

20. A method of providing a tire tread having improved dry handling performance while maintaining wet traction performance and wear by utilizing a tire tread rubber composition made of ingredients comprising:
   a. 100 parts of an elastomer component comprising:
      i. 70-85 parts of polybutadiene having a cis bond content of at least 95% and a Tg of −101 to −110° C.,
      ii. 10-25 parts of at least one styrene-butadiene rubber having a Tg of −40 to −75° C.
      iii. 10-20 parts of natural rubber, polyisoprene, or a combination thereof;
   b. at least one reinforcing silica filler in an amount of 101-150 phr having a surface area of about 150 to about 300 m$^2$/g;
   c. no more than 10 phr of carbon black filler;
   d. 30-50 phr of at least one aromatic hydrocarbon resin having a Tg of about 30 to about 50° C.;
   e. 10-30 phr of liquid plasticizer; and
   f. a cure package,
   wherein the total amount of (d) and (e) is 40 to 65 phr.

* * * * *